(12) United States Patent
Tanaka et al.

(10) Patent No.: US 11,577,533 B2
(45) Date of Patent: Feb. 14, 2023

(54) TENSION DETECTION DEVICE, TENSION DETECTION SYSTEM, AND THERMAL PRINTER

(71) Applicant: KABUSHIKI KAISHA TOSHIBA, Tokyo (JP)

(72) Inventors: Junya Tanaka, Ota Tokyo (JP); Takamitsu Sunaoshi, Yokohama Kanagawa (JP); Shinji Takakura, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 108 days.

(21) Appl. No.: 17/004,219

(22) Filed: Aug. 27, 2020

(65) Prior Publication Data

US 2021/0206184 A1  Jul. 8, 2021

(30) Foreign Application Priority Data

Jan. 6, 2020  (JP) .............................. JP2020-000503

(51) Int. Cl.
| | |
|---|---|
| *B41J 35/08* | (2006.01) |
| *B41J 2/35* | (2006.01) |
| *G01L 5/108* | (2020.01) |
| *B41J 13/00* | (2006.01) |
| *B41J 15/00* | (2006.01) |
| *B41J 15/16* | (2006.01) |

(52) U.S. Cl.
CPC ............ *B41J 35/08* (2013.01); *B41J 2/35* (2013.01); *B41J 13/00* (2013.01); *B41J 13/0009* (2013.01); *B41J 15/00* (2013.01); *B41J 15/16* (2013.01); *B41J 15/165* (2013.01); *G01L 5/108* (2013.01)

(58) Field of Classification Search
CPC ..... B41J 35/08; B41J 2/35; B41J 13/00; B41J 13/0009; B41J 15/00; B41J 15/16; B41J 15/165; B41J 2/325; G01L 5/108
See application file for complete search history.

(56) References Cited

U.S. PATENT DOCUMENTS

| | | | | |
|---|---|---|---|---|
| 10,647,139 | B1* | 5/2020 | Kitahara | ............... B41J 33/24 |
| 2019/0240990 | A1* | 8/2019 | Seki | ..................... B41J 29/38 |

FOREIGN PATENT DOCUMENTS

| | | | | |
|---|---|---|---|---|
| JP | S62-113581 A | | 5/1987 | |
| JP | H5-10836 A | | 1/1993 | |
| JP | H8-101080 A | | 4/1996 | |
| JP | 2012166367 | * | 9/2012 | ............. B41J 33/52 |

(Continued)

*Primary Examiner* — Kristal Feggins
(74) *Attorney, Agent, or Firm* — Finnegan, Henderson, Farabow, Garrett & Dunner, LLP

(57) ABSTRACT

A tension detection device according to an embodiment includes a base, a support member, a continuous body, an external force detection unit, and a tension detection unit. One end or both ends of the support member are fixed to the base. The support member has an external force measurement section integrally provided at the one end or both ends thereof. The continuous body is conveyed while wound around an outer circumference of the support member. The external force detection unit is provided at the external force measurement section of the support member. The external force detection unit detects an external force. The tension detection unit detects tension of the continuous body based on a detection result from the external force detection unit.

10 Claims, 18 Drawing Sheets

(56) References Cited

FOREIGN PATENT DOCUMENTS

| JP | 5393975 B2 | 1/2014 | | |
|----|------------|--------|---|---|
| JP | 6088600 B2 | 3/2017 | | |
| JP | 2017-74799 A | 4/2017 | | |
| JP | 2019081633 | * | 5/2019 | .............. B41J 17/02 |

* cited by examiner

FIG. 16A

| PRINTING SPEED (ips) | RIBBON DIAMETER 1 | RIBBON DIAMETER 2 | RIBBON DIAMETER 3 | RIBBON DIAMETER 4 |
|---|---|---|---|---|
| SPEED 1 | SPEED PROFILE 011 | SPEED PROFILE 021 | SPEED PROFILE 031 | SPEED PROFILE 041 |
| SPEED 2 | SPEED PROFILE 012 | SPEED PROFILE 022 | SPEED PROFILE 032 | SPEED PROFILE 042 |
| SPEED 3 | SPEED PROFILE 013 | SPEED PROFILE 023 | SPEED PROFILE 033 | SPEED PROFILE 043 |
| SPEED 4 | SPEED PROFILE 014 | SPEED PROFILE 024 | SPEED PROFILE 034 | SPEED PROFILE 044 |
| SPEED 5 | SPEED PROFILE 015 | SPEED PROFILE 025 | SPEED PROFILE 035 | SPEED PROFILE 045 |

FIG. 16B

| PRINTING SPEED (ips) | RIBBON DIAMETER 5 | RIBBON DIAMETER 6 | RIBBON DIAMETER 7 |
|---|---|---|---|
| SPEED 1 | SPEED PROFILE 051 | SPEED PROFILE 061 | SPEED PROFILE 071 |
| SPEED 2 | SPEED PROFILE 052 | SPEED PROFILE 062 | SPEED PROFILE 072 |
| SPEED 3 | SPEED PROFILE 053 | SPEED PROFILE 063 | SPEED PROFILE 073 |
| SPEED 4 | SPEED PROFILE 054 | SPEED PROFILE 064 | SPEED PROFILE 074 |
| SPEED 5 | SPEED PROFILE 055 | SPEED PROFILE 065 | SPEED PROFILE 075 |

FIG. 17

SPEED PROFILE

| STATE (DIRECTION) | CURRENT VALUE (mA) | TIME (msec) |
|---|---|---|
| NORMAL DIRECTION | 22 | 46 |
| NORMAL DIRECTION | 22 | 14 |
| NORMAL DIRECTION | 22 | 91 |
| NORMAL DIRECTION | 22 | |
| NORMAL DIRECTION | 93 | 8 |
| NORMAL DIRECTION | 45 | 25 |
| NORMAL DIRECTION | 29 | 53 |
| NORMAL DIRECTION | 28 | 5 |
| NORMAL DIRECTION | 24 | 5 |
| NORMAL DIRECTION | 20 | 5 |
| NORMAL DIRECTION | 14 | 5 |
| STOP | 0 | 0 | ns
TENSION DETECTION DEVICE, TENSION DETECTION SYSTEM, AND THERMAL PRINTER

CROSS-REFERENCE TO RELATED APPLICATION

This application claims priority from Japanese Patent Application No. 2020-000503 filed on Jan. 6, 2020, the contents of which are incorporated herein by reference in their entirety.

FIELD

Embodiments described herein relate generally to a tension detection device, a tension detection system, and a thermal printer.

BACKGROUND

In the related art, a thermal printer that performs printing using an ink ribbon is known. In the thermal printer, by bringing a thermal head into pressure contact with an ink ribbon on a sheet and generating heat, ink is transferred to the sheet. In the thermal printer, tension acting on the ink ribbon is adjusted according to a change in an environmental temperature, a pattern to be printed, a printing speed, and the like.

Incidentally, a tension detection device that detects tension of a continuous body is known. For example, in Patent Document 1: Japanese Patent No. 5393975, a tension detection device detects tension acting on a continuous body being conveyed while wound around an outer circumference of a roll. The tension detection device includes a support shaft, a roll, and a stress sensor. An end portion of the support shaft is fixed to a rigid support member. The roll is rotatably supported by the support shaft via a bearing. The stress sensor is embedded in a small cavity provided in the support shaft. However, since the bearing is provided between the roll and the support shaft, the tension of the continuous body may not be detected with high accuracy.

For example, in Patent Document 2: Japanese Unexamined Patent Application, First Publication No. H05-10836, a tension detection device detects tension of a continuous body from a load applied to a roll that conveys the continuous body. The tension detection device includes a load support portion, a support beam, a fixing portion, and a strain gauge. The load support portion supports the load on a rotation shaft of the roll. The load support portion is provided with a bearing that rotatably supports the rotation shaft of the roll. The support beam supports the load support portion. Two support beams are provided in a direction perpendicular to the rotation shaft of the roll at an equal distance from an axis. The fixing portion fixes the support beam. The strain gauge is attached to a surface of the support beam. However, since the bearing is provided between the roll and the support beam, the tension of the continuous body may not be detected with high accuracy.

BRIEF DESCRIPTION OF THE DRAWINGS

FIG. 16A is a diagram showing partial table data regarding a normal rotation application direction used in the thermal printer according to the embodiment which is an explanatory diagram of Ribbon diameters 1 to 4.

FIG. 16B is a diagram showing partial table data regarding a normal rotation application direction used in the thermal printer according to the embodiment which is an explanatory diagram of Ribbon diameters 5 to 7.

FIG. 17 is a diagram showing an example of a target rotation amount by the thermal printer according to the embodiment.

DETAILED DESCRIPTION

Figure 1:
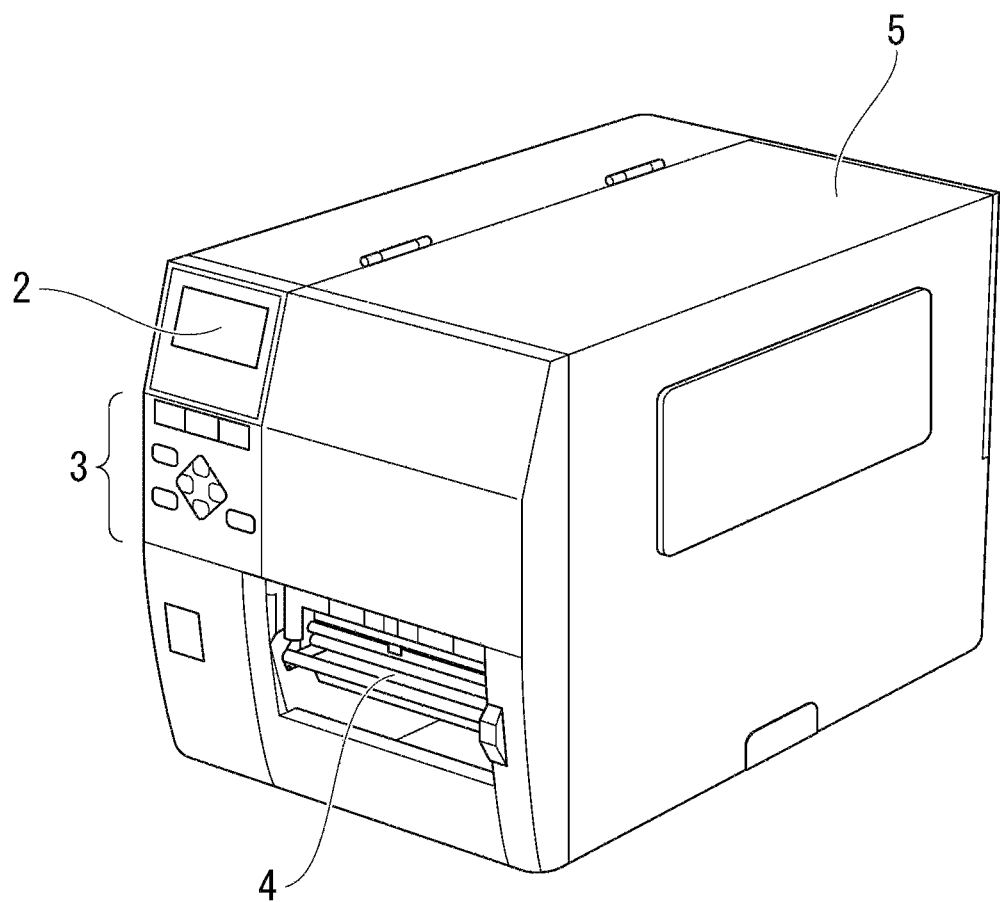
FIG. 1 is a perspective view schematically showing a thermal printer according to an embodiment.

A tension detection device of an embodiment includes a base, a support member, a continuous body, an external force detection unit, and a tension detection unit. One end or both ends of the support member are fixed to the base. The support member has an external force measurement section integrally provided at the one end or both ends thereof. The continuous body is conveyed while wound around an outer circumference of the support member. The external force detection unit is provided at the external force measurement section of the support member. The external force detection unit detects an external force. The tension detection unit detects tension of the continuous body based on a detection result from the external force detection unit.

Hereinafter, a tension detection device, a tension detection system, and a thermal printer according to embodiments will be described with reference to the drawings. In the following description, configurations having the same or similar functions are designated with the same reference numerals. In addition, duplicate descriptions of those configurations may be omitted. Further, an expression "based on XX" as used herein means "based on at least XX" and also includes a case of being based on another element in addition to XX. Further, "based on XX" is not limited to a case in which XX is directly used, but also includes a case of being based on calculation or processing performed on XX. "XX" is an arbitrary element (for example, arbitrary information).

An embodiment will be described with reference to FIGS. 1 to 21. FIG. 1 is a perspective view schematically showing a thermal printer 1 according to the present embodiment. For example, the thermal printer 1 is a thermal transfer printer that performs printing on a sheet using an ink ribbon.

The thermal printer 1 prints a predetermined image on a sheet and discharges the sheet on which the image is printed. Label roll paper is used as an example of the sheet.

As shown in FIG. 1, the thermal printer 1 includes a display unit 2, an operation unit 3, a discharge unit 4, and a cover case 5.

For example, the display unit 2 is an image display device such as a liquid crystal display or an organic electro luminescence (EL) display. The display unit 2 operates as an output interface and displays characters and images. Further, the display unit 2 may operate as an input interface and receive an instruction input from a user.

The operation unit 3 is configured using an existing input device such as a button. The operation unit 3 is operated by the user when the instruction of the user is input to the thermal printer 1. For example, the operation unit 3 receives an input of a print start instruction.

The discharge unit 4 discharges the sheet on which the image is printed.

The cover case 5 covers an internal structure of the thermal printer 1. The cover case 5 is attachable to and detachable from a housing 10 (refer to FIG. 2) of the thermal printer 1.

Figure 2:
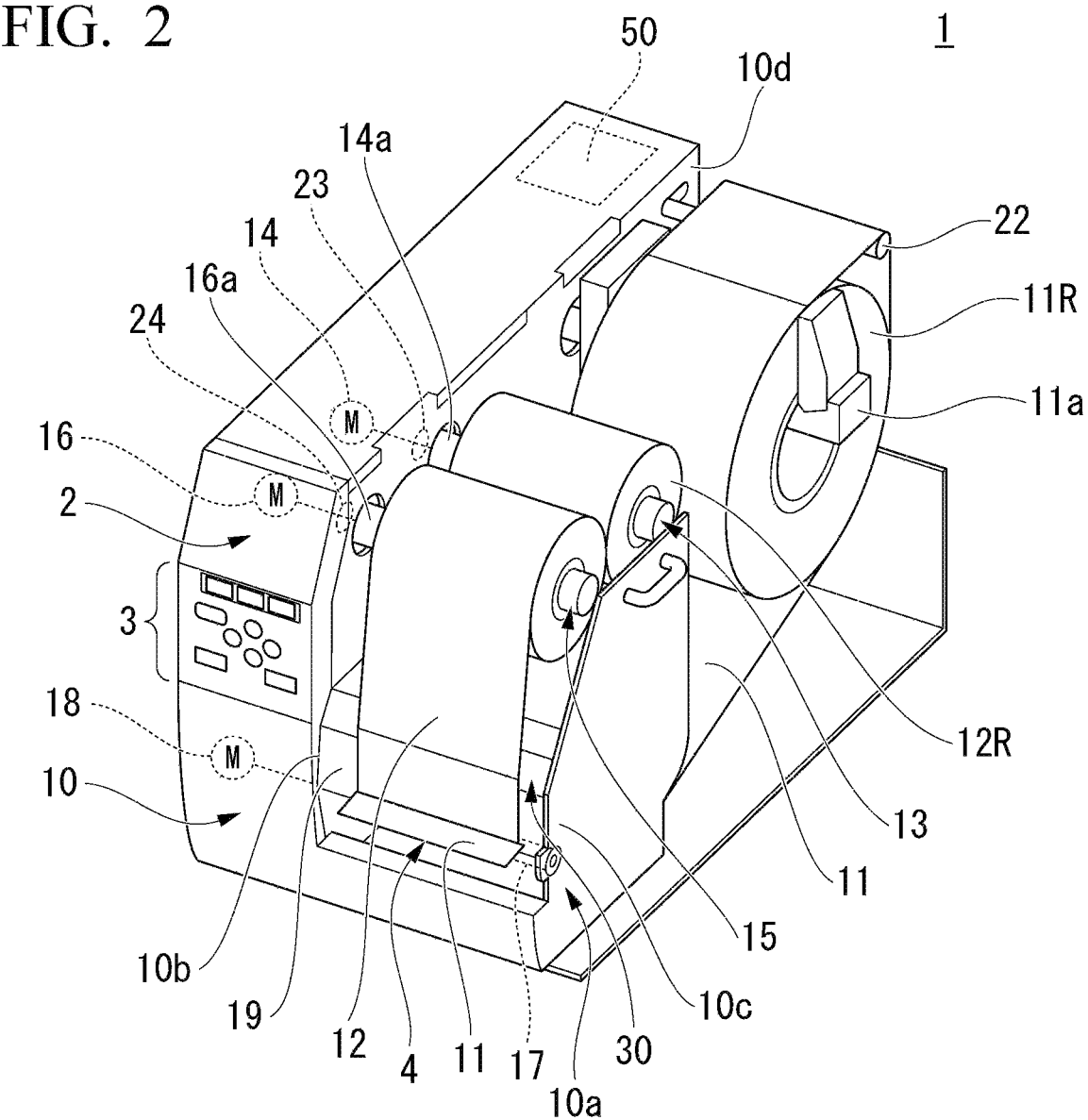
FIG. 2 is a perspective view showing a state in which a cover case of the thermal printer according to the embodiment is removed.

FIG. 2 is a perspective view showing a state in which the cover case 5 of the thermal printer 1 according to the present embodiment is removed.

As shown in FIG. 2, the thermal printer 1 includes a housing 10, a sheet 11 (paper), an ink ribbon 12 (a continuous body), a supply shaft 13, a feed motor 14 (a first drive unit), a winding shaft 15, a winding motor 16 (a second drive unit), a platen roll 17, a conveyance motor 18 (a third drive unit), a thermal head 19, pinch rolls 20 and 21 (refer to FIG. 3), a support member 30, strain gauges 40A to 40D (refer to FIG. 11, an external force detection unit), a tension detection unit 49 (refer to FIG. 13), and a control unit 50.

The housing 10 accommodates components of the thermal printer 1. The cover case 5 (refer to FIG. 1) is openably and closably attached to the housing 10 by a hinge or the like. The discharge unit 4 opens on a front surface side of the housing 10. Hereinafter, in the thermal printer 1, a side (a front side) on which the discharge unit 4 opens is referred to as "a front side," and a side opposite to the front side is referred to as "a rear side."

The housing 10 includes a base 10a that supports the support member 30. The base 10a is disposed on the front side of the housing 10. The base 10a includes a first side plate 10b that supports one end of the support member 30 and a second side plate 10c that supports the other end of the support member 30.

The sheet 11 is band-shaped paper. The sheet 11 forms a roll portion 11R by being wound around a reel 11a in a roll shape. Hereinafter, the roll portion 11R of the sheet 11 may be referred to as "a sheet roll 11R." The sheet 11 is conveyed to a conveyance path by being pulled out from the sheet roll 11R.

The ink ribbon 12 is a tape-shaped ink cartridge. The ink ribbon 12 is sandwiched between the thermal head 19 and the platen roll 17 together with the sheet 11 (refer to FIG. 3). Ink of the ink ribbon 12 is transferred to the sheet 11 by the heat given from the thermal head 19. The ink ribbon 12 is conveyed while wound around an outer circumference of the support member 30.

Figure 3:
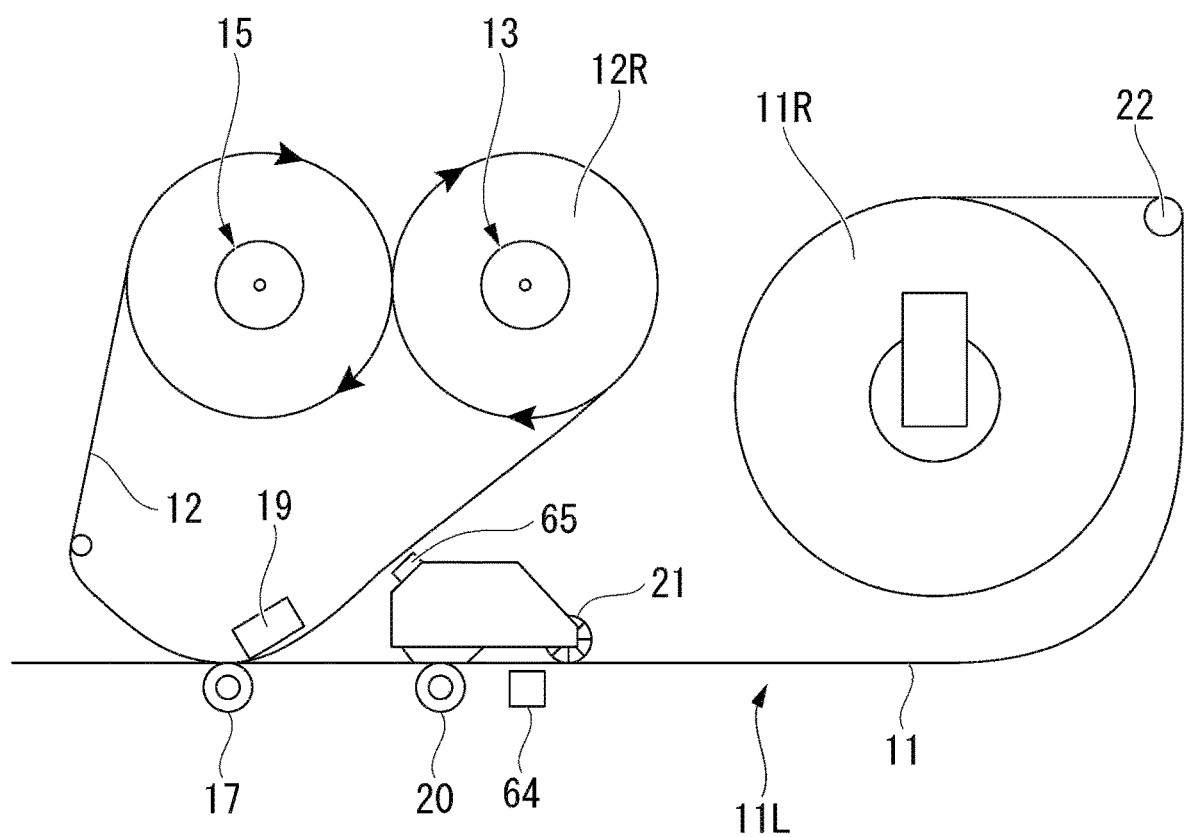
FIG. 3 is a view showing an example of a conveyance path of an ink ribbon used in the thermal printer according to the embodiment.

For example, the ink ribbon 12 is an outwardly wound ink ribbon in which a base film having an ink surface on one side is wound with the ink surface facing outward. FIG. 3 is a view showing an example of a conveyance path for the outwardly wound ink ribbon (the ink ribbon 12). As shown in FIG. 3, the outwardly wound ink ribbon 12 is mounted on the supply shaft 13. Note that the ink ribbon 12 may be an inwardly wound ink ribbon.

The supply shaft 13 is a shaft for feeding the ink ribbon 12. One end of the ink ribbon 12 is wound around the supply shaft 13. The supply shaft 13 is provided on a feed side of the ink ribbon 12. The supply shaft 13 is rotated by the drive of the feed motor 14. A roll portion 12R of the ink ribbon 12 is set on the supply shaft 13. Hereinafter, the roll portion 12R of the ink ribbon 12 may be referred to as "a ribbon roll 12R."

As shown in FIG. 2, the feed motor 14 is a motor that drives the supply shaft 13. A rotation direction of the feed motor 14 is controlled by a direction of a DC drive current. For example, the feed motor 14 is a direct current (DC) motor. The feed motor 14 can rotate the supply shaft 13 normally and in reverse. Here, normal rotation means rotation in a clockwise direction around an axis viewed from the second side plate 10c (refer to FIG. 3). Reverse rotation means the opposite direction of the normal rotation. The ink ribbon 12 is conveyed from the supply shaft 13 to the winding shaft 15 by the normal rotation.

For example, the feed motor 14 directly drives the supply shaft 13. The rotation direction of the feed motor 14 is set to be the same as a rotation direction of the supply shaft 13. The feed motor 14 includes a first shaft 14a coaxially connected to the supply shaft 13. A first slit sensor 23 is attached to the first shaft 14a (refer to FIG. 4). Note that a driving force of the feed motor 14 may be transmitted to the supply shaft 13 via a gear, a belt, or the like.

The winding shaft 15 is a shaft around which the ink ribbon 12 is wound. The other end of the ink ribbon 12 is wound around the winding shaft 15. The winding shaft 15 is provided on a winding side of the ink ribbon 12. The winding shaft 15 is provided on the front side from the supply shaft 13. The winding shaft 15 is rotated by the drive of the winding motor 16.

The winding motor 16 is a motor that drives the winding shaft 15. A rotation direction of the winding motor 16 is controlled by a direction of a DC drive current. For example, the winding motor 16 is a DC motor. The winding motor 16 can rotate the winding shaft 15 normally and in reverse. The ink ribbon 12 is wound around the winding shaft 15 by the normal rotation. Accordingly, the ink ribbon 12 is pulled out from the ribbon roll 12R.

For example, the winding motor 16 directly drives the winding shaft 15. The rotation direction of the winding motor 16 is set to be the same as a rotation direction of the winding shaft 15. The winding motor 16 includes a second shaft 16*a* coaxially connected to the winding shaft 15. A second slit sensor 24 is attached to the second shaft 16*a* (refer to FIG. 4). Note that a driving force of the winding motor 16 may be transmitted to the winding shaft 15 via a gear, a belt, or the like.

Figure 4:
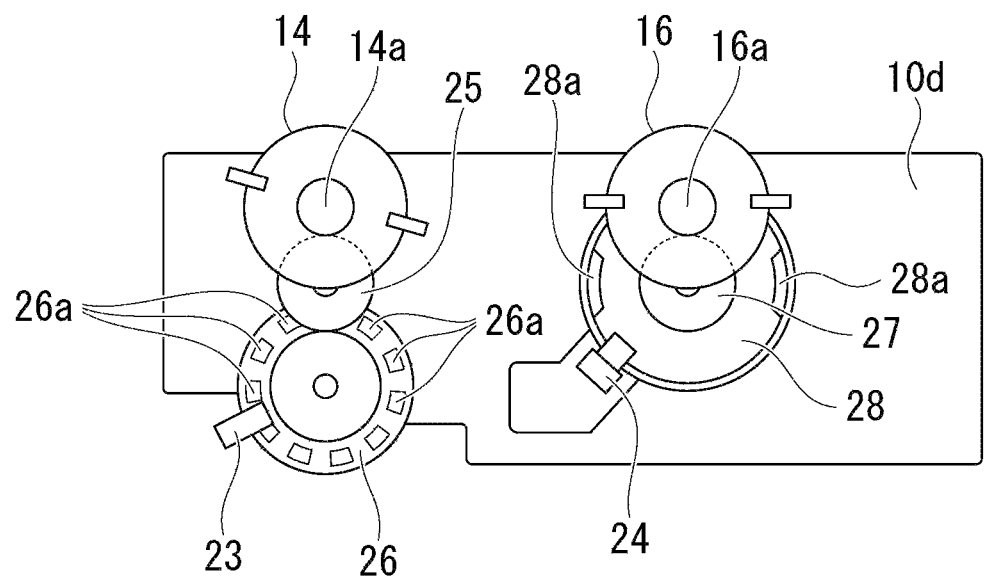
FIG. 4 is a view showing a configuration of a slit sensor that is an example of a detection unit of the thermal printer according to the embodiment.

FIG. 4 is a view showing configurations of the slit sensors 23 and 24 that are examples of a detection unit of the thermal printer 1. In FIG. 4, a right side of the drawing is the front side and a left side of the drawing is the rear side.

A plurality of slit sensors 23 and 24 (for example, two in the present embodiment) are provided. The plurality of slit sensors 23 and 24 are the first slit sensor 23 and the second slit sensor 24. The first slit sensor 23 is disposed on the rear side of the thermal printer 1. The second slit sensor 24 is disposed on the front side of the thermal printer 1.

The first slit sensor 23 is disposed below the first shaft 14*a*. A first slit disk 26 is connected to an end portion of the first shaft 14*a* via a first gear 25. The first slit disk 26 has a plurality of first slit holes 26*a* disposed along an outer circumference of the first slit disk 26. Lengths of first slit holes 26*a* in a circumferential direction are the same.

Figure 5:
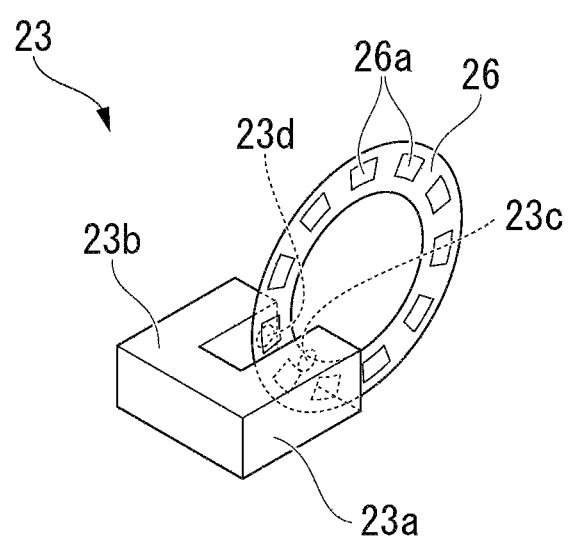
FIG. 5 is a perspective view of a first slit sensor according to the embodiment.

FIG. 5 is a perspective view of the first slit sensor 23. For example, the first slit sensor 23 has a U shape. The first slit sensor 23 includes a first arm 23*a* and a second arm 23*b* facing each other with the outer circumference portion of the first slit disk 26 interposed therebetween. For example, a light emitting element 23*c* such as an LED is provided at a tip end of the first arm 23*a*. For example, a light receiving element 23*d* such as a photodiode is provided at a tip end of the second arm 23*b*. Light from the light emitting element 23*c* is transmitted through the first slit hole 26*a*, and the transmitted light is received by the light receiving element 23*d*. Alternatively, the light from the light emitting element 23*c* is blocked by a disk surface between the two first slit holes 26*a* adjacent to each other in the circumferential direction.

The first slit sensor 23 outputs a pulse signal corresponding to a circumferential speed determined with a diameter of the first slit disk 26. For example, the first slit sensor 23 has a function of encoding the light receiving and light blocking of the light receiving element 23*d* into a pulse signal of high and low. The first slit sensor 23 sends the signal indicating high and low to the control unit 50 (refer to FIG. 14).

As shown in FIG. 4, the second slit sensor 24 is disposed below the second shaft 16*a*. A second slit disk 28 is connected to an end portion of the second shaft 16*a* via a second gear 27. The second slit disk 28 has a plurality of second slit holes 28*a* disposed along an outer circumference of the second slit disk 28. The number of the second slit holes 28*a* is different from the number of the first slit holes 26*a*. Two second slit holes 28*a* are provided symmetrically to each other on a side surface of the second slit disk 28 with a center of rotation of the second slit disk 28 interposed therebetween.

The second slit sensor 24 has the same configuration as the first slit sensor 23, and thus a detailed description thereof will be omitted. The first slit sensor 23 and the second slit sensor 24 are separated from the ribbon roll 12R and the like by a partition wall 10*d* (refer to FIG. 2). The second slit sensor 24 sends a predetermined signal to the control unit 50 (refer to FIG. 14).

As shown in FIG. 3, the platen roll 17 is a roll for pulling out the sheet roll 11R. The platen roll 17 is provided in the middle of the sheet conveyance path 11L. The platen roll 17 faces the thermal head 19. The platen roll 17 brings the ink ribbon 12 and the sheet 11 into pressure contact with each other. The platen roll 17 rotates by the drive of the conveyance motor 18 (refer to FIG. 2).

As shown in FIG. 2, the conveyance motor 18 is a motor that drives the platen roll 17. For example, the conveyance motor 18 is a stepping motor. For example, the conveyance motor 18 directly drives the platen roll 17. Note that a driving force of the conveyance motor 18 may be transmitted to the platen roll 17 via a gear, a belt, or the like.

As shown in FIG. 3, the thermal head 19 thermally transfers the ink of the ink ribbon 12 drawn by the normal rotation of the supply shaft 13 onto the sheet 11. The thermal head 19 is disposed above the platen roll 17. The thermal head 19 faces the platen roll 17. The thermal head 19 is biased from above to below to be in contact with the platen roll 17. The thermal head 19 performs printing on the conveyed sheet 11 using the ink ribbon 12. The thermal head 19 presses the sheet 11 being conveyed between the thermal head 19 and the platen roll 17 against the platen roll 17.

The thermal head 19 has a plurality of heating elements (not shown) disposed in a line. The heating elements generate heat by the application of electric power. The thermal head 19 causes the heating elements to generate heat by the selective application of electric power to the plurality of heating elements. The thermal head 19 melts or sublimates the ink of the ink ribbon 12 by the heat generated by the heating elements to transfer the ink to the sheet 11 for printing.

For example, the pinch rolls 20 and 21 are rolls (guide rolls) that guide the sheet 11 pulled out from the sheet roll 11R. The pinch rolls 20 and 21 are provided on an upstream side of the platen roll 17 in a sheet conveyance direction. For example, the thermal printer 1 may be provided with a damper 22 on an upstream side of the pinch rolls 20 and 21 in the sheet conveyance direction to reduce an impact applied at the moment when the sheet 11 stretches.

Figure 6:
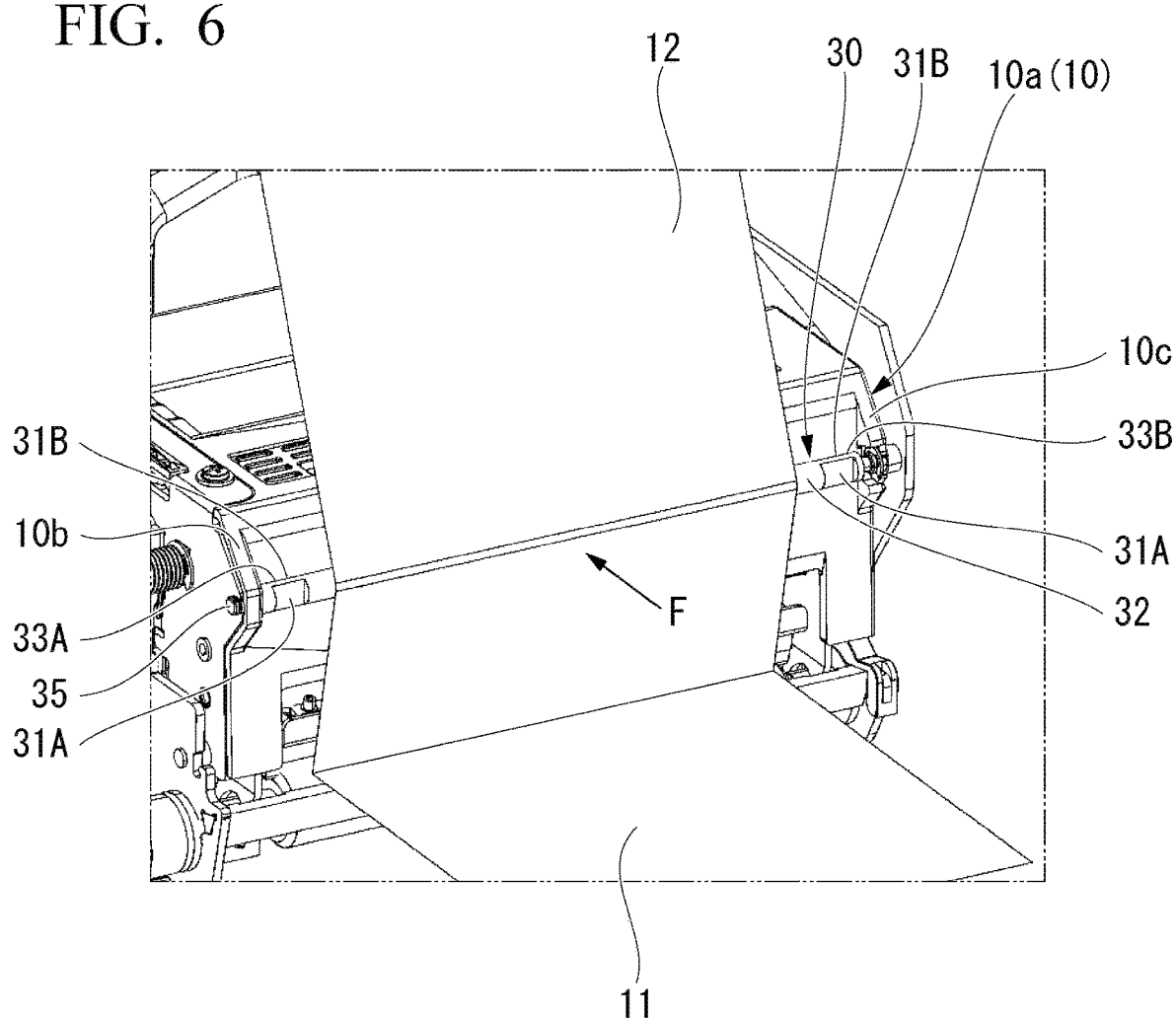
FIG. 6 is a perspective view showing a fixed state of a support member according to the embodiment.

FIG. 6 is a perspective view showing a fixed state of the support member 30 according to the present embodiment.

As shown in FIG. 6, the support member 30 has a rod shape extending in a width direction of the ink ribbon 12 (a direction orthogonal to a conveyance direction of the ink ribbon 12). Both ends of the support member 30 are fixed to the base 10*a*. The support member 30 has external force measurement sections 31A and 31B integrally provided at both ends thereof.

Hereinafter, the external force measurement section 31A provided on a side on which an external force F acts on the support member 30 is referred to as "a first external force measurement section 31A," and the external force measurement section 31B provided on a side opposite to the side on which an external force F acts on the support member 30 (a side opposite to the first measurement section 31A) is referred to as "a second external force measurement section 31B." The first external force measurement section 31A is provided on the front side of both ends of the support member 30. The second external force measurement section 31B is provided on the rear side of both ends of the support member 30.

Figure 7:
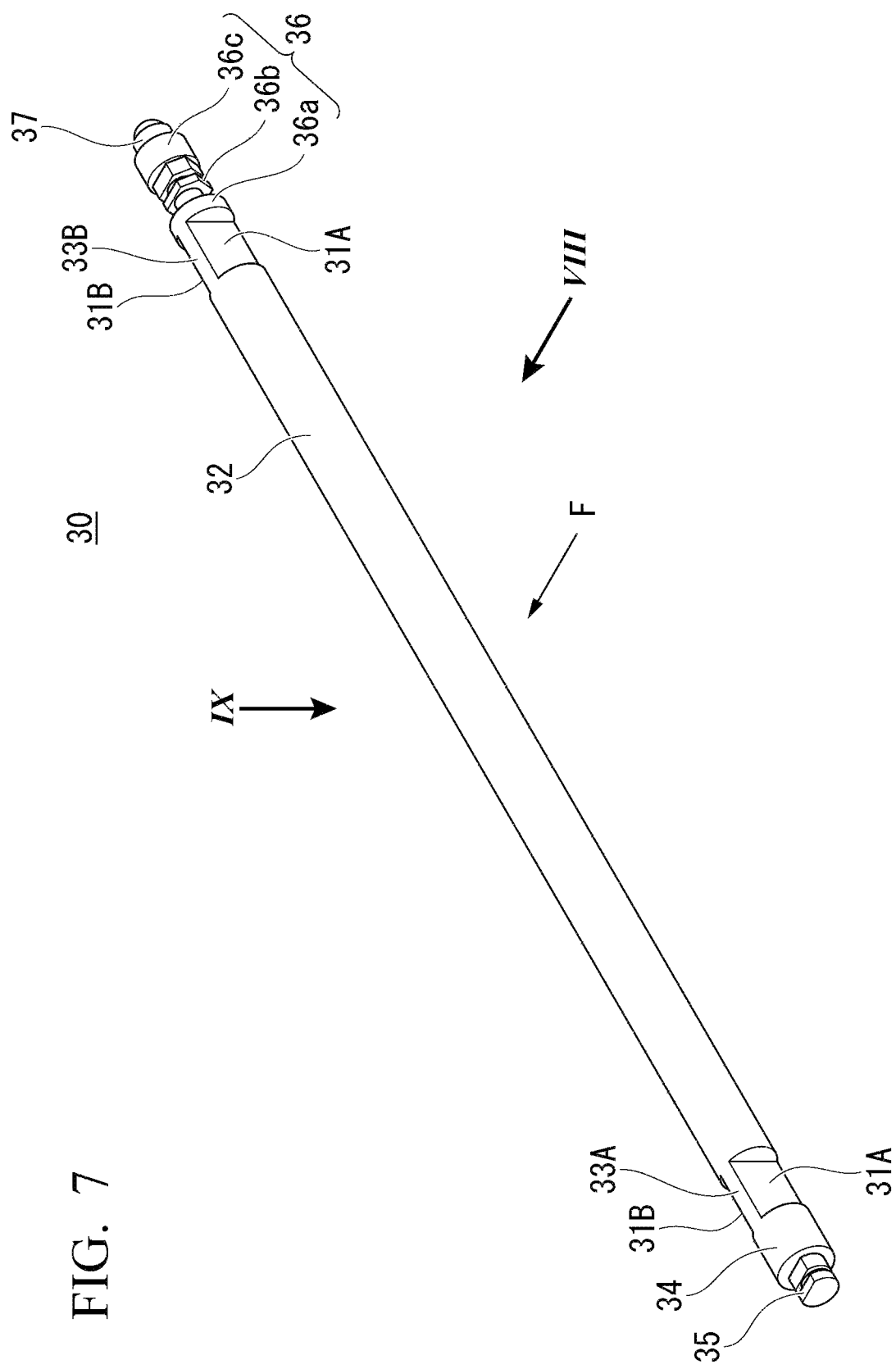
FIG. 7 is a perspective view of the support member according to the embodiment.
Figure 8:
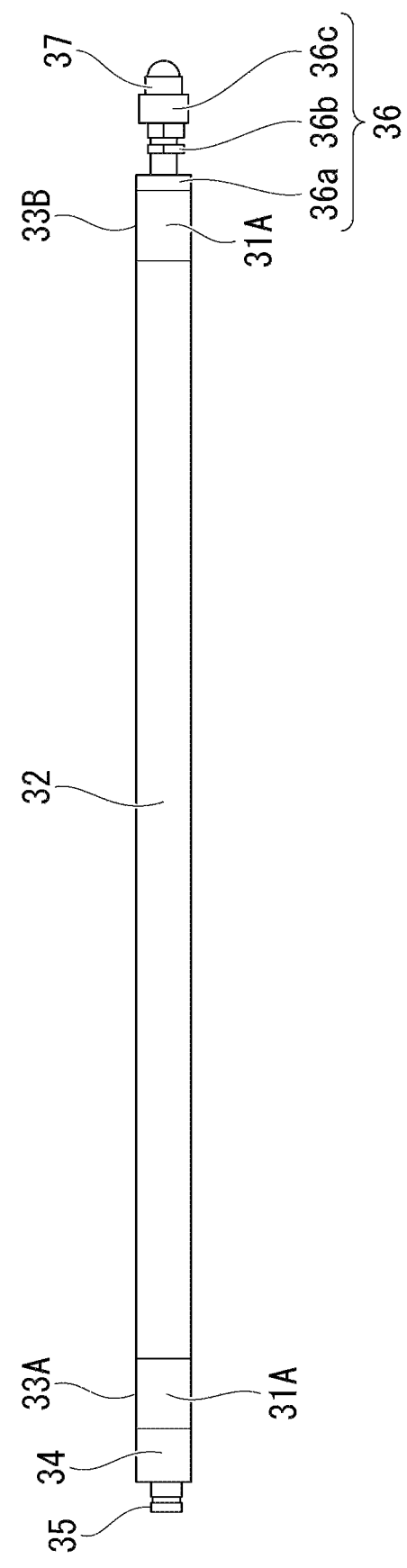
FIG. 8 is a view from arrow VIII in FIG. 7.
Figure 9:
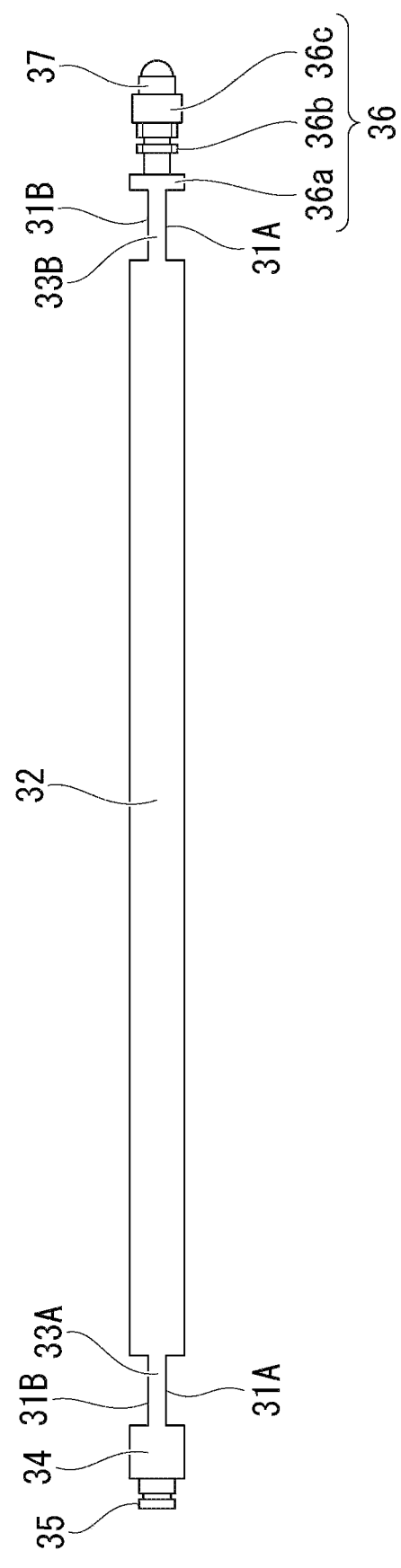
FIG. 9 is a view from arrow IX in FIG. 7.

FIG. 7 is a perspective view of the support member 30. FIG. 8 is a view from arrow VIII in FIG. 7. FIG. 8 corresponds to a view of the support member 30 from the front side. FIG. 9 is a view from arrow IX in FIG. 7. FIG. 9 corresponds to a view of the support member 30 from above.

As shown in FIG. 7, the support member 30 includes a column portion 32, beam portions 33A and 33B, a first connecting portion 34, a first end portion 35, a second connecting portion 36, and a second end portion 37. The column portion 32, the beam portions 33A and 33B, the first connecting portion 34, the first end portion 35, the second connecting portion 36, and the second end portion 37 are integrally formed of the same member.

The column portion 32 has a cylindrical shape extending in the width direction of the ink ribbon 12 (refer to FIG. 6). As shown in FIG. 6, the column portion 32 extends horizontally. A length of the column portion 32 in an axial direction is longer than a length of the ink ribbon 12 in the width direction.

As shown in FIG. 7, the beam portions 33A and 33B are formed of the same member as the column portion 32 in a beam shape. The beam portions 33A and 33B each have a rectangular plate shape extending in the axial direction of the column portion 32. The beam portions 33A and 33B each have a long side in the axial direction of the column portion 32. The beam portions 33A and 33B each have a short side with the same length as an outer diameter of the column portion 32 (refer to FIG. 8). The short side of each of the beam portions 33A and 33B extends vertically. The beam portions 33A and 33B each have a thickness smaller than the outer diameter of the column portion 32 (refer to FIG. 9). The thickness of each of the beam portions 33A and 33B is substantially parallel to the horizon. The beam portions 33A and 33B each have the external force measurement sections 31A and 31B on both surfaces in a thickness direction. The beam portions 33A and 33B are formed at both ends of the column portion 32. Hereinafter, the beam portion 33A formed at one end of the column portion 32 will be referred to as "a first beam portion 33A," and the beam portion 33B formed at the other end of the column portion 32 will be referred to as "a second beam portion 33B."

The first connecting portion 34 is provided at one end of the support member 30. The first connecting portion 34 connects the first beam portion 33A and the first end portion 35 to each other. The first connecting portion 34 is disposed coaxially with the column portion 32. The first connecting portion 34 has a cylindrical shape with the same outer diameter as the column portion 32.

The first end portion 35 is provided at one end of the support member 30. The first end portion 35 is disposed coaxially with the column portion 32. The first end portion 35 has a D-shaped cross section. When viewed in the axial direction of the column portion 32, the first end portion 35 has a D shape. When viewed in the axial direction of the column portion 32, the first end portion 35 is disposed within an outer shape of the first connecting portion 34.

The second connecting portion 36 is provided at the other end of the support member 30. The second connecting portion 36 connects the second beam portion 33B and the second end portion 37 to each other. The second connecting portion 36 is disposed coaxially with the column portion 32. The second connecting portion 36 includes a disk portion 36a having a disk shape with the same outer diameter as the column portion 32, an engagement portion 36b for engaging with the base 10a (refer to FIG. 6), and a cylindrical portion 36c having a cylindrical shape with the same outer diameter as the column portion 32. The engagement portion 36b is disposed between the disk portion 36a and the cylindrical portion 36c.

The second end portion 37 is provided at the other end of the support member 30. The second end portion 37 is disposed coaxially with the column portion 32. The second end portion 37 has a cylindrical shape that extends in the axial direction of the column portion 32. The second end portion 37 has a hemispherical shape that is convex outward in the axial direction. An outer diameter of the second end portion 37 is smaller than the outer diameter of the cylindrical portion 36c. When viewed in the axial direction of the column portion 32, the second end portion 37 is disposed within an outer shape of the cylindrical portion 36c of the second connecting portion 36.

Figure 10:
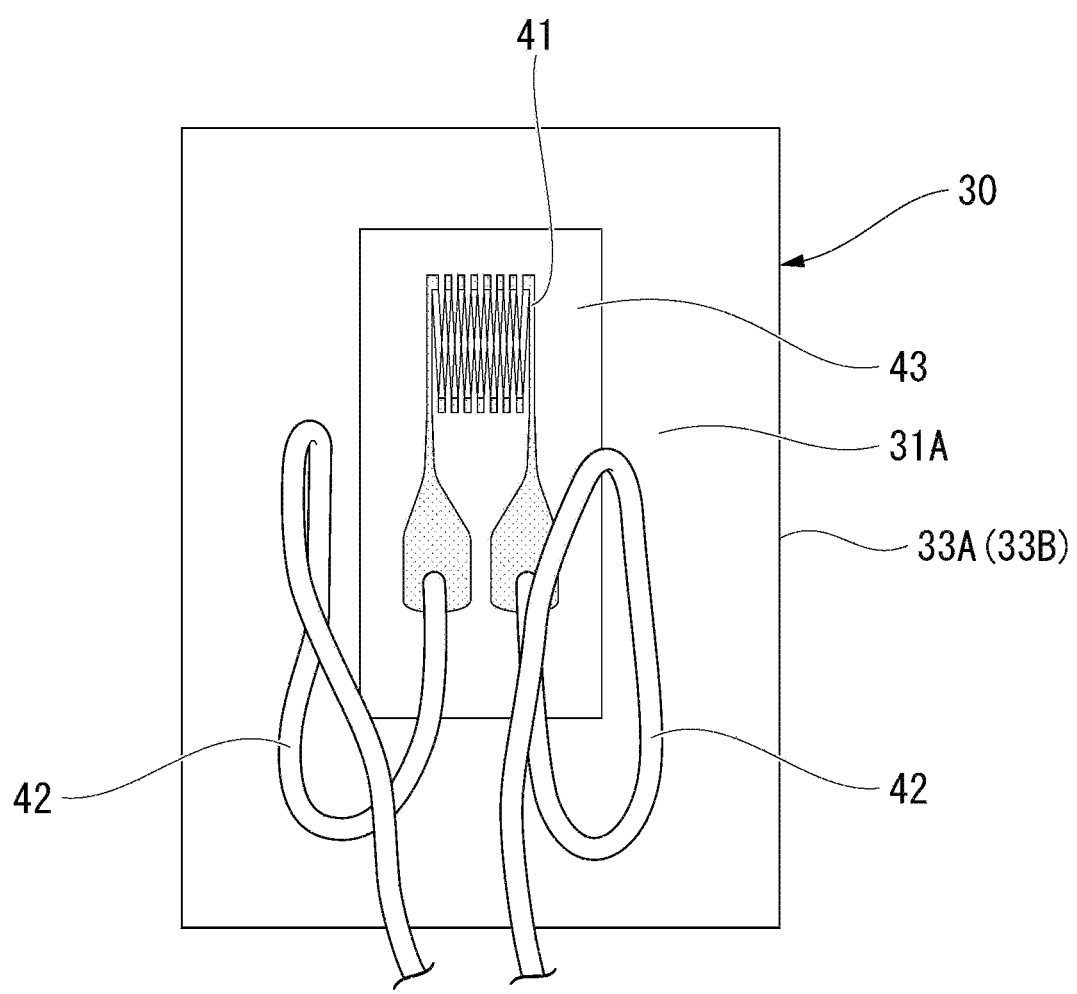
FIG. 10 is an explanatory view of an attachment portion of a strain gauge according to the embodiment.
Figure 11:
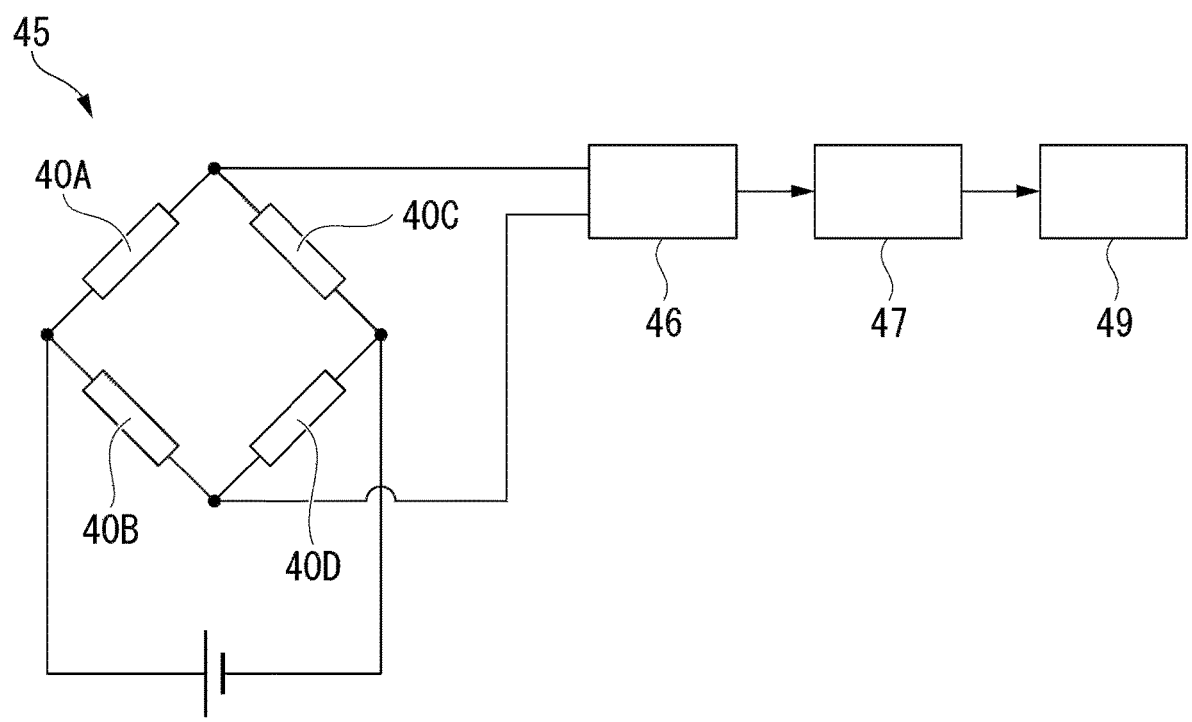
FIG. 11 is an explanatory view of an example of a circuit including the strain gauge according to the embodiment.

FIG. 10 is an explanatory view of an attachment portion of a strain gauge (a first gauge 40A in an example of FIG. 10) according to the present embodiment. FIG. 11 is an explanatory view of an example of a circuit including the strain gauges 40A to 40D. As shown in FIG. 10, the strain gauge 40A is provided at the external force measurement section 31A of the support member 30. The strain gauge 40A detects a strain acting on the external force measurement section 31A.

The strain gauge 40A includes a resistor 41 that expands and contracts in proportion to expansion and contraction of the external force measurement section 31A and changes in a resistance value thereof, and a lead wire 42 connected to the resistor 41.

For example, the resistor 41 is a metal wiring pattern. The resistor 41 is covered with a protective film 43. The strain gauge 40A measures the strain by the change in the resistance value of the resistor 41. The strain gauge 40A is connected to the tension detection unit 49 via the lead wire 42 (refer to FIG. 11). Note that, since the other strain gauges 40B to 40D each have the same configuration as the strain gauge 40A, a detailed description thereof will be omitted.

For example, the strain gauges 40A to 40D are disposed by a two-gauge method. For example, as a wire connecting method of the strain gauges 40A to 40D, a two-active gauge method that is a supplementary method with temperature compensation to eliminate temperature influence of the lead wire 42 may be adopted.

The strain gauges 40A and 40C are attached to the surfaces of both ends (refer to FIG. 7, the first beam portion 33A and the second beam portion 33B) of the support member 30. The ink ribbon 12 is conveyed while wound around the outer circumference of the support member 30 (the column portion 32) (refer to FIG. 6). As shown in FIG. 6, the ink ribbon 12 is in direct contact with the front side of the column portion 32. Due to tension of the ink ribbon 12 being conveyed while it is wound around the support member 30, the column portion 32 receives a load F (the external force) from the front side. Accordingly, a load acts on the first beam portion 33A and the second beam portion 33B. Then, the first beam portion 33A and the second beam portion 33B are deformed, and this deformation is detected by the strain gauges 40A and 40C. Since the deformation of the first beam portion 33A and the second beam portion 33B reflects the tension acting on the ink ribbon 12, the tension of the ink ribbon 12 can be detected based on detection results by the strain gauges 40A and 40C.

As shown in FIG. 11, a strain gauge corresponds to at least one (for example, two in the present embodiment) of the resistors 40A to 40D. The four resistors 40A to 40D are a first resistor 40A, a second resistor 40B, a third resistor 40C, and a fourth resistor 40D. The four resistors 40A to 40D are connected to each other to form each resistance element of a bridge circuit 45. An output of the bridge circuit 45 is sent to the control unit 50 via an amplifier circuit 46, an A/D converter 47, and the like (refer to FIG. 14). In the present embodiment, the first resistor 40A corresponds to a strain gauge and may be described as a first gauge 40A. Similarly, the third resistor 40C also corresponds to another strain gauge and may be described as a third gauge 40C.

The first gauge 40A is provided on each of the first external force measurement sections 31A of the first beam portion 33A and the second beam portion 33B (refer to FIG. 6). The first gauge 40A is provided on the front side of both ends of the support member 30.

The third gauge 40C is provided on each of the second external force measurement sections 31B of the first beam portion 33A and the second beam portion 33B (refer to FIG. 6). The third gauge 40C is provided on the rear side of both ends of the support member 30. The third gauge 40C is provided on a side opposite to the first gauge 40A in the thickness direction of the first beam portion 33A and the second beam portion 33B.

The second resistor 40B and the fourth resistor 40D are provided in a bridge box (not shown).

For example, when the load F (refer to FIG. 6) acts on the support member 30, the first gauge 40A expands and the resistance value increases. On the other hand, the third gauge 40C is compressed and the resistance value decreases. Here, a strain amount generated in each resistor 41 (the first resistor to the fourth resistor) is referred to as e1, e2, e3, or e4, a gauge factor as Ks, and a bridge voltage as E. Thus, an output voltage V of the bridge circuit 45 is calculated according to the following equation (1).

$$V = (Ks \times E/4) \times \{(e1-e2)+(e3-e4)\} \quad (1)$$

From the above equation (1), the output voltage V of the bridge circuit 45 is output in a state in which an output voltage corresponding to shear stress on the support member 30 in a direction in which the load F acts is amplified to some extent. The shear stress corresponds to a magnitude of the load F within an elastic limit of the support member 30.

For example, a temperature coefficient of each resistor 41 is preferably the same. In this case, the bridge circuit 45 also exhibits a temperature compensation function excluding the temperature influence.

As described above, when the support member 30 receives a pressure from the ink ribbon 12, the beam portions 33A and 33B of the support member 30 are bent. When the beam portions 33A and 33B of the support member 30 bend, the strain gauges 40A and 40C each detect the strain amount. The strain gauges 40A and 40C each output the detected strain amount (a measurement value) as a voltage. This voltage has a correlation with a bending amount of each of the beam portions 33A and 33B of the support member 30. Therefore, by obtaining a relational equation between the voltage and a displacement amount in advance, an absolute value of the bending amount can be obtained.

The tension detection unit 49 detects the tension of the ink ribbon 12 based on the detection results by the strain gauges 40A and 40C. The tension detection unit 49 sends a detection result of the tension of the ink ribbon 12 to the control unit 50 (refer to FIG. 14).

Figure 12:
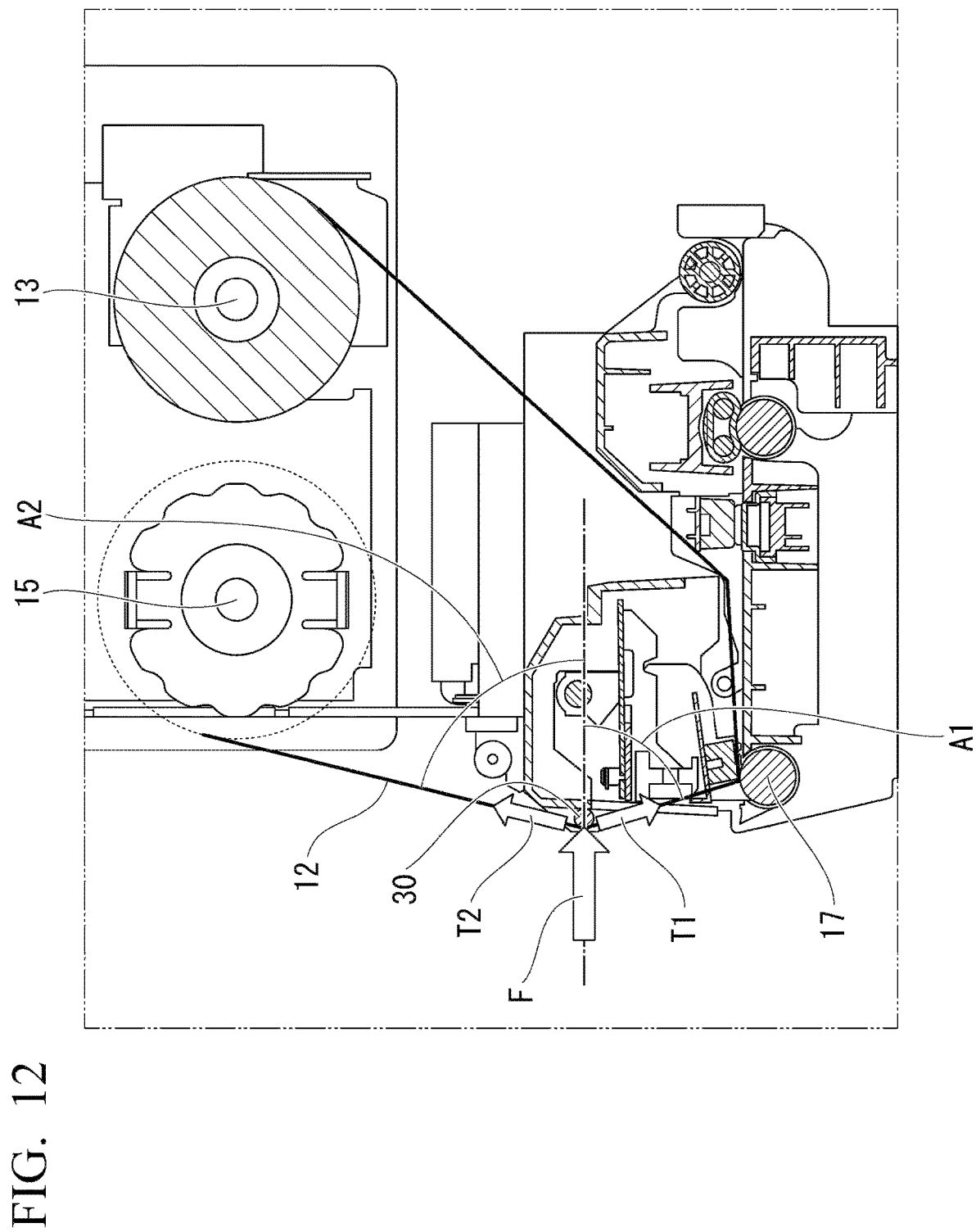
FIG. 12 is an explanatory view of a conversion of a measurement value from the strain gauge into tension of the ink ribbon according to the embodiment.

FIG. 12 is an explanatory view of a conversion of a measurement value from the strain gauge into the tension of the ink ribbon 12. FIG. 12 corresponds to a view from the other end side (the second end portion 37 side) of the support member 30 in the axial direction.

In FIG. 12, a reference numeral T1 represents tension acting on the ink ribbon 12 from the support member 30 side toward the platen roll 17 side (hereinafter, also referred to as "first ribbon tension"), a reference numeral T2 represents tension acting on the ink ribbon 12 from the support member 30 side toward the winding shaft 15 side (hereinafter, also referred to as "second ribbon tension"), a reference numeral F represents a pressure received by the support member 30 from the ink ribbon 12 (hereinafter, also referred to as "a ribbon external force"), a reference numeral A1 represents an angle formed between a virtual line along the first ribbon tension T1 and a virtual horizontal line passing through an axis of the support member 30 (hereinafter, also referred to as "a first angle"), and a reference numeral A2 represents an angle formed between a virtual line along the second ribbon tension T2 and a virtual horizontal line (hereinafter, also referred to as "a second angle").

The ribbon external force F is calculated according to the following equation (2).

$$F = T1 \cos A1 + T2 \cos A2 \quad (2)$$

In the above equation (2), the ribbon external force F corresponds to the measurement value from the strain gauge.

When the first ribbon tension T1 is balanced with the second ribbon tension T2, the following equation (3) is satisfied.

$$T1 = T2 \quad (3)$$

Therefore, the measurement value from the strain gauge can be converted into the tension of the ink ribbon 12 based on the above equations (2) and (3).

For example, the tension detection unit 49 always detects the tension of the ink ribbon 12. The detection result of the tension of the ink ribbon 12 is sent to the control unit 50 (refer to FIG. 14). For example, the detection result of the tension of the ink ribbon 12 is used as input information for drive control to the winding shaft 15. For example, the control unit 50 performs feedback control for maintaining the tension acting on the ink ribbon 12 wound around the winding shaft 15 while being continuously conveyed to be constant. Accordingly, the quality of winding the processed ink ribbon 12 around the winding shaft 15 can be made constant from a center side of the ink ribbon 12 to an outer circumferential side.

As shown in FIG. 12, the ink ribbon 12 that has passed through the platen roll 17 is wound around the outer circumference of the support member 30 and then is directly wound around the winding shaft 15. In this case, since a conveyance angle of the ink ribbon 12 changes depending on a winding amount of the ink ribbon 12, the tension of the ink ribbon 12 changes. For example, a sensor (for example, an optical sensor) that detects the conveyance angle of the ink ribbon 12 may be provided to detect a change in the tension of the ink ribbon 12. For example, the conveyance angle of the ink ribbon 12 may be estimated from the detection of the number of rotations of the winding shaft 15. Accordingly, the amount of deviation caused by the change in the conveyance angle of the ink ribbon 12 may be corrected.

Figure 13:
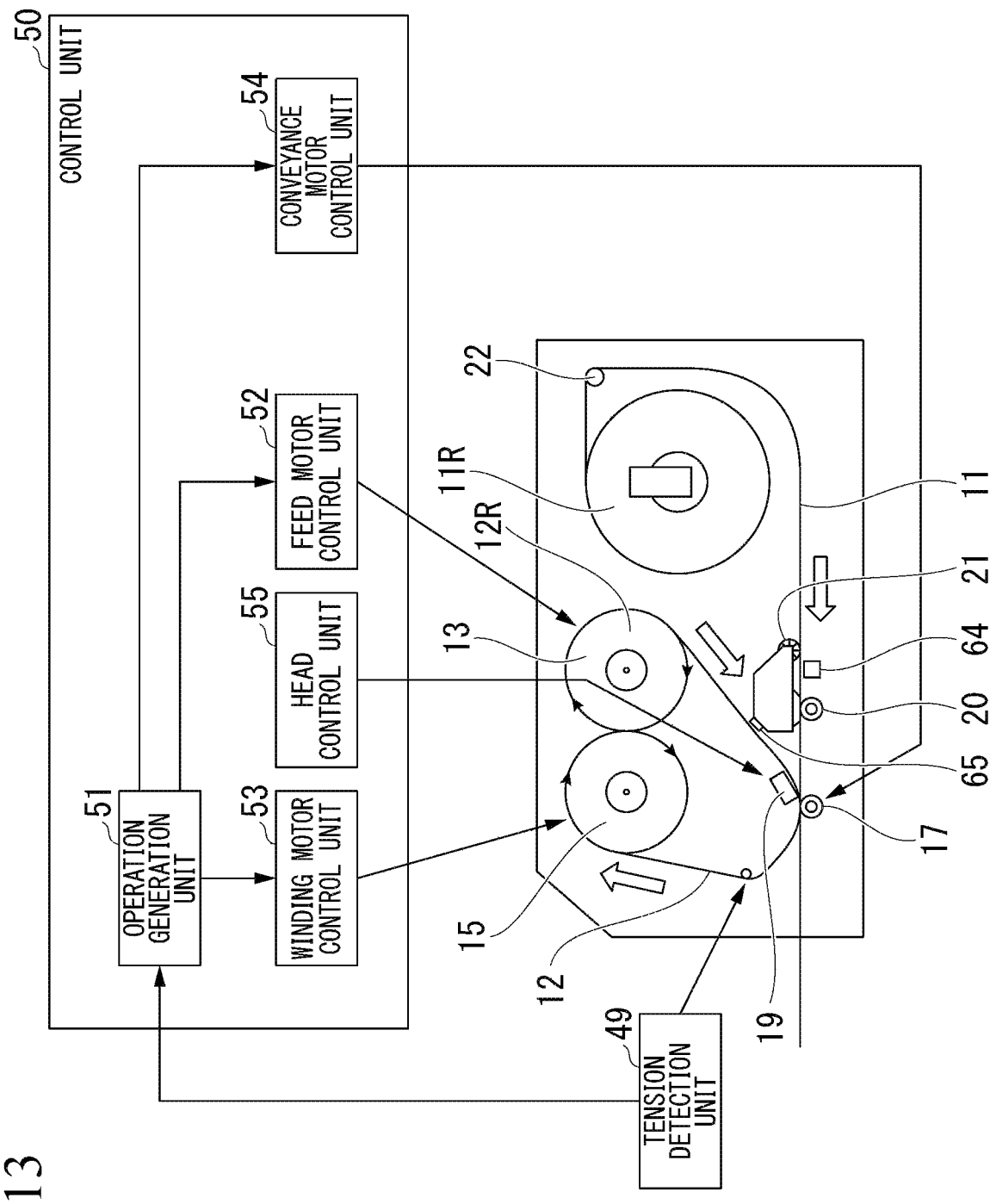
FIG. 13 is a view showing an overall system of the thermal printer according to the embodiment.

FIG. 13 is a view showing an overall system of the thermal printer 1 according to the embodiment.

As shown in FIG. 13, the control unit 50 includes an operation generation unit 51, a feed motor control unit 52, a winding motor control unit 53, a conveyance motor control unit 54, and a head control unit 55.

The operation generation unit 51 generates a drive command for the feed motor 14, the winding motor 16, and the conveyance motor 18 (refer to FIG. 14) based on the detection result from the tension detection unit 49. The operation generation unit 51 sends the generated drive command to the feed motor control unit 52, the winding motor control unit 53, and the conveyance motor control unit 54.

Figure 14:
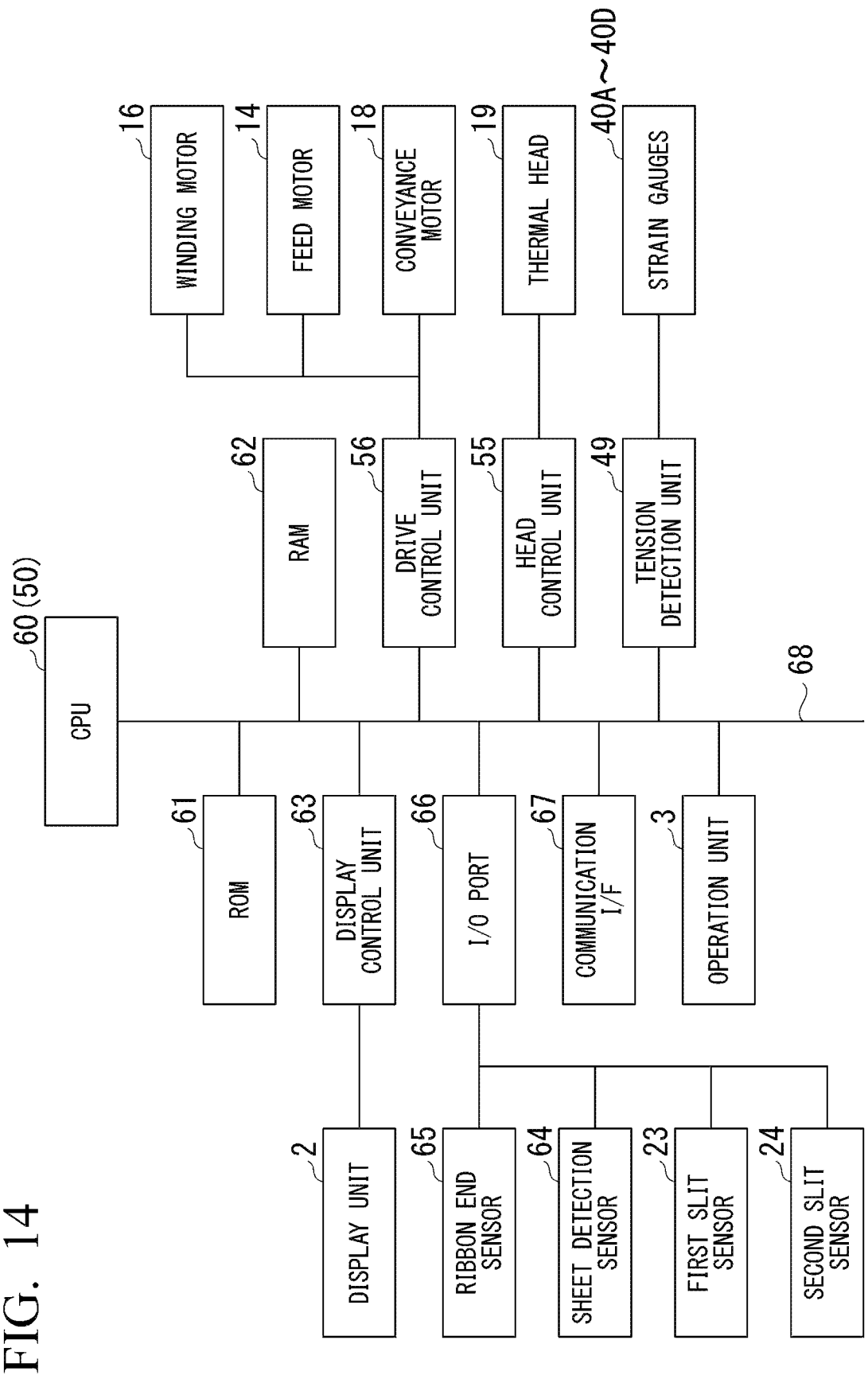
FIG. 14 is a block diagram showing a system configuration of the thermal printer according to the embodiment.

The feed motor control unit 52, the winding motor control unit 53, and the conveyance motor control unit 54 constitute a drive control unit 56 (refer to FIG. 14).

The feed motor control unit 52 controls the feed motor 14. For example, the feed motor control unit 52 controls the feed motor 14 based on the drive command for the feed motor 14 sent from the operation generation unit 51.

The winding motor control unit 53 controls the winding motor 16. For example, the winding motor control unit 53 controls the winding motor 16 based on the drive command for the winding motor 16 sent from the operation generation unit 51.

The conveyance motor control unit 54 controls the conveyance motor 18. For example, the conveyance motor control unit 54 controls the conveyance motor 18 based on the drive command for the conveyance motor 18 sent from the operation generation unit 51.

The head control unit 55 controls the thermal head 19. For example, the head control unit 55 controls a voltage to be applied to (a heat amount to be generated in) the thermal head 19.

For example, the operation generation unit 51 calculates variables of the feed motor 14 and the winding motor 16 at an arbitrary timing. For example, the calculation timing may be from a printing start to a thermal transfer start. Alternatively, the calculation timing may be during thermal transfer or may be immediately after the electric power is turned on.

FIG. 14 is a block diagram showing a system configuration of the thermal printer 1 according to the embodiment. The drive control unit 56 includes the feed motor control unit 52, the winding motor control unit 53, and the conveyance motor control unit 54 (refer to FIG. 13).

The drive control unit 56 applies tension to the ink ribbon 12 to control the conveyance of the ink ribbon 12. For example, the drive control unit 56 applies the constant tension to the ink ribbon 12 regardless of the amount of the roll portion of the supply shaft 13 (the remaining ribbon amount) and the amount of the roll portion of the winding shaft 15 (the used ribbon amount). For example, the drive control unit 56 uses a large scale integration (LSI).

For example, the drive control unit 56 drives the winding motor 16 and the feed motor 14 by receiving an application direction, a current value, and a time from a speed profile table. For example, the drive control unit 56 corrects in advance (performs preliminary correction of) the drive current of the winding motor 16 based on printing data of the head control unit 55 so that the tension of the ink ribbon 12 becomes constant. For example, the drive control unit 56 changes the drive currents of the feed motor 14 and the winding motor 16 based on the detection result from the tension detection unit 49 so that the tension of the ink ribbon 12 becomes constant.

The control unit 50 includes a Central Processing Unit (CPU) 60, a non-volatile Read Only Memory (ROM) 61, and a volatile Random Access Memory (RAM) 62. The CPU 60, the ROM 61, and the RAM 62 cooperate with each other to form the control unit 50.

For example, the ROM 61 holds in advance information about the slit sensor. For example, the ROM 61 holds in advance various information about the first slit sensor 23 and the second slit sensor 24. The ROM 61 stores table data, firmware, and application programs.

For example, the table data is the speed profile table. For example, the speed profile table holds a target rotation amount consisting of a time and a current value of a DC drive current applied to the winding motor 16 for each application direction. For example, the speed profile table holds another target rotation amount consisting of a time and a current value of a DC drive current applied to the feed motor 14 for each application direction.

The RAM 62 is for a work area. The RAM 62 stores information such as a type of the ink ribbon 12 set via the operation unit 3. The operation unit 3 has various keys and buttons. The operation unit 3 registers the information of the ink ribbon 12 set by the user in the RAM 62.

The control unit 50 controls the entire thermal printer 1. The control unit 50 measures rotation speeds of the slit disks 26 and 28 (refer to FIG. 4) based on the outputs of the slit sensors 23 and 24. For example, the control unit 50 measures a time required for one optical axis to pass through one first slit hole 26a in the first slit sensor 23. Alternatively, the control unit 50 counts how many times the optical axis has passed through the first slit hole 26a within a fixed time. By this count, the control unit 50 obtains a circumferential speed of the first slit disk 26. The control unit 50 calculates an angular speed of the feed motor 14 (an angular speed of the supply shaft 13) by multiplying the circumferential speed of the first slit disk 26 by various constants from the ROM 61. The control unit 50 obtains a rotation state such as whether the supply shaft 13 is stopped or rotating or a rotation direction.

The control unit 50 may obtain an angular speed of the winding motor 16 (an angular speed of the winding shaft 15). The control unit 50 may automatically detect a remaining amount of the installed ink ribbon 12 at the time of reset or startup after the user installs the ink ribbon 12 in the thermal printer 1.

The control unit 50 extracts a target rotation amount of the feed motor 14 and a target rotation amount of the winding motor 16 in a direction in which tension is applied to the ink ribbon 12 that the information from the RAM 62 indicates. The control unit 50 controls the feed motor 14 and the winding motor 16 based on the target rotation amount of the feed motor 14 and the target rotation amount of the winding motor 16.

The thermal printer 1 includes a display control unit 63 for controlling a display of the display unit 2, a sheet detection sensor 64 for jamming or cueing the sheet 11, a ribbon end sensor 65 that detects a silver film provided at a terminal end of the ink ribbon 12, an I/O port 66 for various sensors, a communication interface (a communication I/F) 67 that receives printing data from a personal computer connected to a network, and a bus 68.

The ribbon end sensor 65 applies light to the ink surface of the ink ribbon 12 and detects reflected light therefrom. The ribbon end sensor 65 detects reflection by the silver film after continuous non-reflection.

The strain gauges 40A to 40D are connected to the tension detection unit 49. An output signal from the tension detection unit 49 is used for conveyance control of the ink ribbon 12 together with other signals.

Hereinafter, an example of a case of manually operating the thermal printer 1 will be described.

For example, the sheet roll 11R is set in the thermal printer 1. For example, the user sets the outwardly wound ink ribbon 12.

The control unit 50 causes the display unit 2 to display a message prompting the user to input the information such as the type of the ink ribbon 12. The operation unit 3 sets "a ribbon type 00" by a user operation. Next, the thermal printer 1 reads a printing speed by a user operation. The thermal printer 1 receives data to be printed from a personal computer or the like via a cable or the like (not shown). The control unit 50 acquires a speed profile for each motor before printing processing.

As described above, the feed motor 14 and the winding motor 16 are DC motors. Therefore, the control unit 50 acquires the speed profile to maintain a conveyance distance of the ink ribbon 12 to be constant according to the printing speed regardless of the remaining amount of the ink ribbon 12.

Figure 15A:
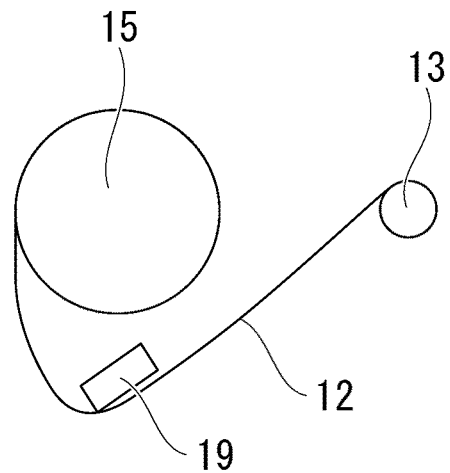
FIG. 15A is an explanatory view of a ribbon diameter of the ink ribbon used in the thermal printer according to the embodiment in which a ribbon diameter of a supply shaft is small (a ribbon diameter of a winding shaft is large).
Figure 15B:
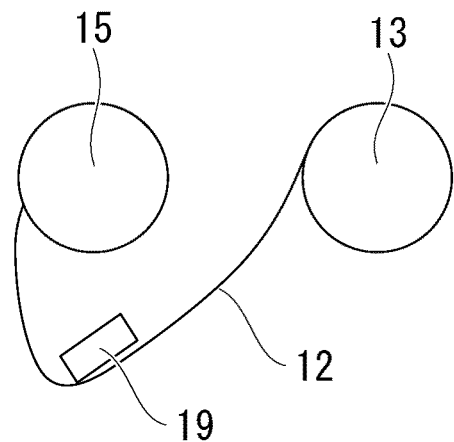
FIG. 15B is an explanatory view of a ribbon diameter of the ink ribbon used in the thermal printer according to the embodiment in which a ribbon diameter of a supply shaft is medium (a ribbon diameter of a winding shaft is medium).
Figure 15C:
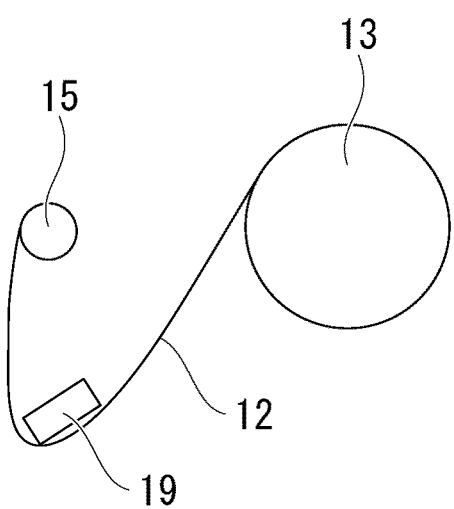
FIG. 15C is an explanatory view of a ribbon diameter of the ink ribbon used in the thermal printer according to the embodiment in which a ribbon diameter of a supply shaft is large (a ribbon diameter of a winding shaft is small).

FIG. 15A is an explanatory view of a ribbon diameter of the ink ribbon 12 used in the thermal printer 1 according to the embodiment in which a ribbon diameter of the supply shaft 13 is small (a ribbon diameter of the winding shaft 15 is large). FIG. 15B is an explanatory view of a ribbon diameter of the ink ribbon 12 used in the thermal printer 1 according to the embodiment in which a ribbon diameter of the supply shaft 13 is medium (a ribbon diameter of the winding shaft 15 is medium). FIG. 15C is an explanatory view of a ribbon diameter of the ink ribbon 12 used in the thermal printer 1 according to the embodiment in which a ribbon diameter of the supply shaft 13 is large (a ribbon diameter of the winding shaft 15 is small).

As shown in FIGS. 15A to 15C, in the ink ribbon 12, the constant conveyance distance is maintained regardless of the ribbon diameter. The control unit 50 controls the supply shaft 13 and the winding shaft 15 so that the conveyance distance of the ink ribbon 12 becomes constant in each of the situations of FIGS. 15A to 15C. For example, the winding motor 16 generates a rotational driving force of a magnitude that slightly pulls the ink ribbon 12. The control unit 50 causes the ink ribbon 12 to run with the ink ribbon 12 stretched. The control unit 50 controls to maintain the conveyance distance of the ink ribbon 12 to be constant while applying tension to the ink ribbon 12 with the change of the drive current value and drive time of the DC motor.

First, the control unit 50 acquires the speed profile of the supply shaft 13 on the rear side. The control unit 50 acquires data in an operation mode on the rear side. For example, all the speed profiles for the supply shaft 13 from the entire speed profile table are developed in a predetermined area of the RAM 62. The control unit 50 reads the preset type information of the ink ribbon 12 from the RAM 62. The control unit 50 sends a drive command for the supply shaft 13 to the drive control unit 56. The drive control unit 56 rotates the supply shaft 13 to draw the ink ribbon 12.

The winding motor 16 cooperates with the feed motor 14 to apply tension to the ink ribbon 12. Here, the tension means a tensile force for winding up the ink ribbon 12 and a back tension by which a supply side (the feed motor 14) rotates in a reverse direction of a winding side. For example, the drive control unit 56 controls the winding motor 16 and the feed motor 14 so that the tensile force in a winding direction is slightly larger than the back tension in a reverse direction thereof.

The speed profile table has a plurality of speed profiles having a drive current application direction, a current value, and a drive time. The speed profile table holds a plurality of speed profiles for the winding motor 16. The speed profile table holds a plurality of speed profiles for each ribbon diameter of the winding shaft 15 and for each printing speed. Here, the printing speed means a speed at which the thermal head 19 performs printing on the sheet 11. Further, the speed profile table holds a plurality of speed profiles for the feed motor 14 for each ribbon diameter of the supply shaft 13 and for each printing speed.

Hereinafter, an example in which the control unit 50 causes the supply shaft 13 to rotate normally will be described.

FIG. 16A is a diagram showing partial table data regarding a normal rotation application direction used in the thermal printer 1 according to the present embodiment which is an explanatory diagram of Ribbon diameters 1 to 4. FIG. 16B is a diagram showing partial table data regarding a normal rotation application direction used in the thermal printer 1 according to the present embodiment which is an explanatory diagram of Ribbon diameters 5 to 7.

As shown in FIGS. 16A and 16B, the table data stores a plurality of ribbon profiles such as Speed profile 011 and the like for each printing speed and for each ribbon diameter. Here, the printing speed ips (inch per sec) means, for example, a unit in which the distance printed per second is expressed in inches. "Speed 1" and the like correspond to, for example, 3 ips, 5 ips, . . . 14 ips. "Ribbon diameter 1" and the like correspond to, for example, φ30, φ40, φ50, . . . φ100.

FIG. 17 shows specific values of Speed profile 011 for "Ribbon diameter 1" and "Speed 1" among the plurality of speed profiles in FIG. 16A.

As shown in FIG. 17, in the speed profile, information about the current values and the times to drive in the normal rotation direction is sequentially described in time series.

Figure 18:
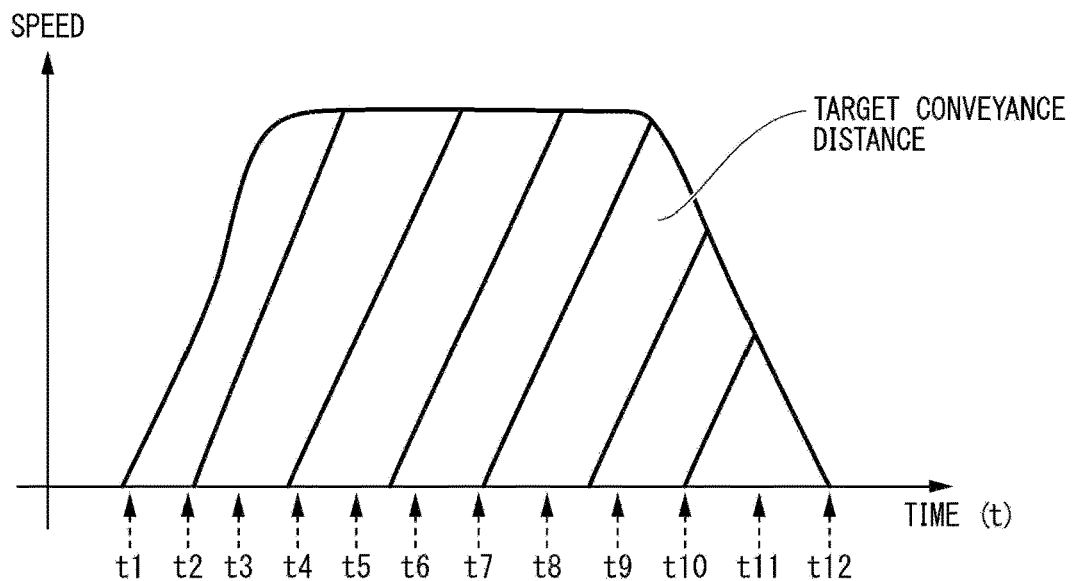
FIG. 18 is an explanatory diagram of a target conveyance distance of the ink ribbon in the thermal printer according to the embodiment.

FIG. 18 is an explanatory diagram of the target conveyance distance of the ink ribbon 12. The total area represented by diagonal lines in FIG. 18 represents the target conveyance distance of the ink ribbon 12. In FIG. 18, a section between two times t (for example, time t1 and time t2) is a command section for one speed. The command section for one speed corresponds to, for example, a time section of 12 divisions in FIG. 17.

For example, the control unit 50 obtains the ribbon diameter of the supply shaft 13 from the output of the first slit sensor 23. For example, the control unit 50 obtains the number of rotations of the first slit disk 26 within a certain period, and obtains a ribbon diameter from the number of rotations. For example, the control unit 50 writes the drive current value and the drive time thereof in the RAM 62 according to the ribbon diameter and the printing speed preset by the user.

For example, the control unit 50 acquires a speed profile of the normal rotation for the winding shaft 15 on the front side in the same manner as the example of the supply shaft 13. For example, in printing, the control unit 50 rotates the supply shaft 13 in the reverse rotation direction and the winding shaft 15 in the normal rotation direction to feed the ink ribbon 12 while maintaining a tensioned state.

For example, the control unit 50 rotates the conveyance motor 18 and the pinch rolls 20 and 21, and performs cueing of the sheet 11 by the output of the sheet detection sensor 64. The ink ribbon 12 and the sheet 11 are sandwiched between the thermal head 19 and the platen roll 17. The thermal head 19 performs printing on the sheet 11. The printed sheet 11 is discharged from the discharge unit 4.

For example, the control unit 50 further conveys the ink ribbon 12. For example, when the ribbon end sensor 65 detects the terminal end of the ribbon, the control unit 50 stops the feed motor 14, the winding motor 16, and the conveyance motor 18. For example, the control unit 50 causes the display unit 2 to display a message notifying that replacement is required.

Figure 19:
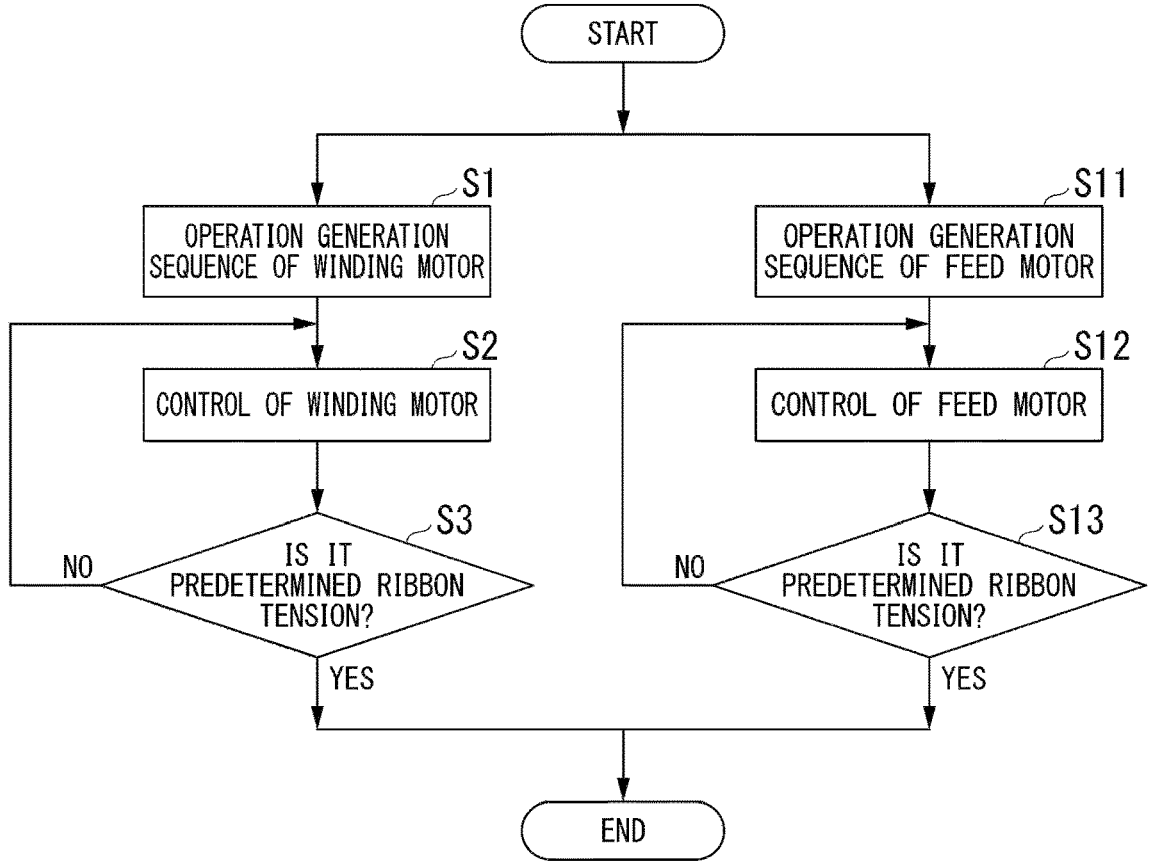
FIG. 19 is a flowchart showing an example of control by a drive control unit according to the embodiment.
Figure 20:
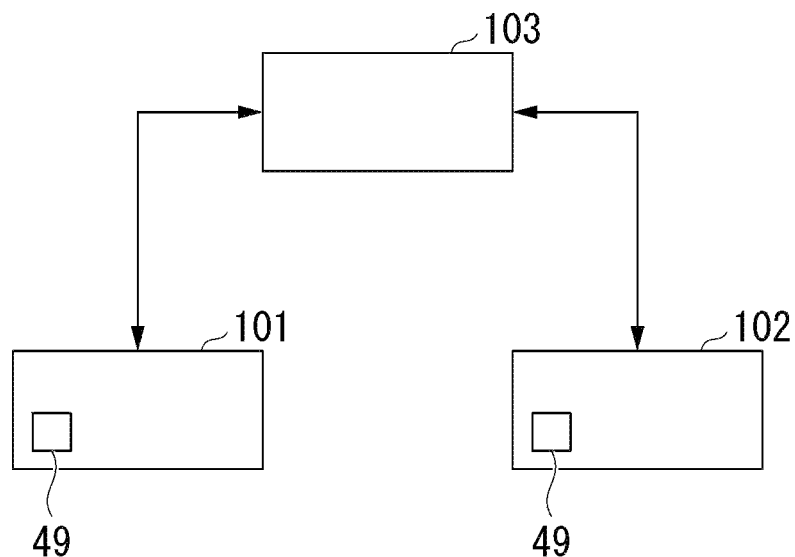
FIG. 20 is a diagram showing a configuration example of a tension detection system according to a first modification example of the embodiment.

Hereinafter, an example of a processing flow by the drive control unit 56 of the thermal printer 1 will be described. FIG. 19 is a flowchart showing an example of control by the drive control unit 56 according to the embodiment. For example, the drive control unit 56 controls the motors 14 and 16 from the start of printing to the end of printing. For example, the drive control unit 56 controls the motors 14 and 16 based on the speed profile.

An example of control of the winding motor 16 will be described.

First, an operation generation sequence of the winding motor 16 is executed (Step S1 in FIG. 19). For example, in Step S1, a speed profile of the winding motor 16 is acquired.

After Step S1, the winding motor 16 is controlled (Step S2 in FIG. 19).

After Step S2, it is determined whether or not the ink ribbon 12 has a predetermined tension (Step S3 in FIG. 19).

In a case in which the ink ribbon 12 has a predetermined tension (Step S3: YES), a drive current of the winding motor 16 is maintained constant.

On the other hand, in a case in which the ink ribbon 12 does not have a predetermined tension (Step S3: NO), a drive current of the winding motor 16 is changed. For example, in a case in which tension of the ink ribbon 12 is less than a predetermined tension, a drive current of the winding motor 16 is increased. For example, in a case in which tension of the ink ribbon 12 is a predetermined tension or more, a drive current of the winding motor 16 is decreased.

An example of control of the feed motor 14 will be described.

First, an operation generation sequence of the feed motor 14 is executed (step S11 in FIG. 19). For example, in Step S11, a speed profile of the feed motor 14 is acquired.

After Step S11, the feed motor 14 is controlled (Step S12 in FIG. 19).

After Step S12, it is determined whether or not the ink ribbon 12 has a predetermined tension (Step S13 in FIG. 19).

In a case in which the ink ribbon 12 has a predetermined tension (Step S13: YES), a drive current of the feed motor 14 is maintained constant.

On the other hand, in a case in which the ink ribbon 12 does not have a predetermined tension (Step S13: NO), a drive current of the feed motor 14 is changed. For example, in a case in which tension of the ink ribbon 12 is less than a predetermined tension, a drive current of the feed motor 14 is decreased. For example, in a case in which tension of the ink ribbon 12 is a predetermined tension or more, a drive current of the feed motor 14 is increased.

Hereinafter, an example of a procedure for evaluating the slack of the ink ribbon 12 using the support member 30 of the embodiment will be described.

First, before actually performing measurement, sensitivity adjustment and zero point adjustment of the support member 30 are performed. A value obtained by taking in the output of the strain gauge through the A/D converter 47 or the like in a state in which the support member 30 is not in contact with anything is read as zero data. This value is recorded and is used for subsequent zero correction.

Next, the winding motor 16 is driven and the ink ribbon 12 is conveyed while wound around the outer circumference of the support member 30. In this state, while reading an output value of the strain gauge through the A/D converter 47, a point where the output value of the strain gauge starts to change is searched for. The drive current of the feed motor 14 is changed in several steps from the time when the ink ribbon 12 starts to be conveyed while wound around the outer circumference of the support member 30, and the tension of the ink ribbon 12 at each step is recorded. This recorded value is compared with the ideal output characteristics. As a result of the comparison, when the value is insufficient with respect to the ideal value, the feed motor 14 and the winding motor 16 are controlled to correct the insufficient amount. This correction is executed for all strain gauges used for evaluating the slack of the ink ribbon 12.

Note that, a series of operations described above may be programmed in a computer in advance and be automatically executed by a command from the CPU 60 via the motor driver, the A/D converter 47, and the like.

The output voltage based on the detection result from the strain gauge is preferably 0 V when the support member 30 does not receive a pressure from the ink ribbon 12. Further, the output voltage is preferably more than 0 V and 10 V or less when the support member 30 receives a pressure from the ink ribbon 12. Further, an average output voltage (an average voltage) during continuous measurement of the ink ribbon 12 being conveyed while wound around the outer circumference of the support member 30 is preferably adjusted to about 5V. Such adjustment can be performed by determining a measurement range and the like while observing an output level of the strain gauge. The output value of each strain gauge is read by the CPU 60 via the A/D converter 47 and the like as described above.

The output value of the strain gauge is corrected by the CPU 60. This correction is preferably performed by a calibration curve of the tension of the ink ribbon 12. The ink ribbon 12 is conveyed under the tension, but the tension is not always constant. In the actual thermal printer 1, the tension applied to the ink ribbon 12 always fluctuates due to disturbance factors such as device vibration and temperature fluctuations. Therefore, the tension of the ink ribbon 12 is measured by the strain gauge via the support member 30 that comes into contact with the ink ribbon when the ink ribbon 12 is conveyed. The measurement value from the strain gauge is converted into digital data by the A/D converter 47 and sent to the CPU 60. The CPU 60 corrects the measurement value from the strain gauge according to the calibration curve of the tension of the ink ribbon 12. Accordingly, the slack of the ink ribbon 12 can be evaluated more accurately.

According to the embodiment, the thermal printer 1 includes the base 10a, the support member 30, the ink ribbon 12, the strain gauges 40A to 40D, and the tension detection unit 49. Both ends of the support member 30 are fixed to the base 10a. The support member 30 has external force measurement sections 31A and 31B integrally provided at both ends thereof. The ink ribbon 12 is conveyed while wound around an outer circumference of the support member 30. The strain gauges 40A and 40C are provided at the external force measurement sections 31A and 31B of the support member 30. The tension detection unit 49 detects the tension of the ink ribbon 12 based on the detection results by the strain gauges 40A to 40D. The following effects are exhibited by the above configuration.

Since the both ends of the support member 30 are fixed to the base 10a, it is possible to eliminate influence such as vibration due to the rotation as compared with a case in which the support member 30 rotates with respect to the base 10a. In addition, since the external force measurement sections 31A and 31B are integrally provided at both ends of the support member 30, detection accuracy of the strain gauges 40A to 40D can be improved as compared with a case in which the external force measurement parts 31A and 31B are separated from the support member 30 (a separation structure). In addition, a rigidity of the external force measurement sections 31A and 31B can be improved and the influence such as vibration can be reduced as compared with the above-described separation structure. In addition, since the ink ribbon 12 is conveyed while wound around the outer periphery of the support member 30, the influence such as vibration of the roll can be eliminated as compared with a case in which a bearing is provided between the roll and the support shaft (in a case in which the ink ribbon 12 is conveyed while wound around the outer circumference of a rotating roll). Therefore, the tension of the ink ribbon 12 can be detected with high accuracy.

In addition, adverse influence on the winding of the ink ribbon 12 due to the vibration of the roll can be eliminated as compared with a case in which the ink ribbon 12 is conveyed while wound around the outer circumference of a rotating roll. Therefore, a high speed response is excellent.

The thermal printer 1 further includes the supply shaft 13 around which one end of the ink ribbon 12 is wound, the feed motor 14 that drives the supply shaft 13, the winding shaft 15 around which the other end of the ink ribbon 12 is wound, the winding motor 16 that drives the winding shaft 15, and the drive control unit 56 that controls the feed motor 14 and the winding motor 16 based on the detection result from the tension detection unit 49. The following effects are exhibited by the above configuration.

It is possible to properly adjust the tension acting on the ink ribbon 12 during the conveyance until the ink ribbon 12 is wound around the winding shaft 15 after the ink ribbon wound around the supply shaft 13 is drawn. Therefore, it is possible to suppress a printing defect due to wrinkles caused by the uneven tension of the ink ribbon 12. Therefore, it is possible to suppress the deterioration of printing quality.

The thermal printer 1 further includes the platen roll 17 that brings the ink ribbon 12 and the sheet 11 into pressure contact with each other, and the conveyance motor 18 that drives the platen roll 17. The drive control unit 56 controls the conveyance motor 18 based on the detection result from the tension detection unit 49. The following effects are exhibited by the above configuration.

Since conveyance speeds of the ink ribbon 12 and the sheet 11 can be controlled, the ink ribbon 12 and the sheet 11 can be smoothly conveyed in a state in which the ink ribbon 12 and the sheet 11 are in pressure contact with each other.

The thermal printer 1 further includes the thermal head 19 that faces the platen roll 17, and the head control unit 55 that controls the thermal head 19. The drive control unit 56 corrects in advance (performs preliminary correction of) the drive current of the winding motor 16 based on printing data of the head control unit 55 so that the tension of the ink ribbon 12 becomes constant. The following effects are exhibited by the above configuration.

Incidentally, on the winding side of the ink ribbon 12, it is necessary to separate the ink ribbon 12 from the thermally transferred sheet 11. The force required to separate the ink ribbon 12 from the sheet 11 changes depending on a tint of the color of the sheet 11. In this case, if the winding motor 16 is controlled with a constant drive current, the ink ribbon 12 cannot be wound with a constant tension. For example, in a case in which the force required to separate the ink ribbon 12 from the sheet 11 is large, the winding motor 16 is controlled with a constant drive current. In this case, a winding speed of the ink ribbon 12 decreases and the tension of the ink ribbon 12 decreases. On the other hand, in a case in which the force required to separate the ink ribbon 12 from the sheet 11 is small, the winding motor 16 is controlled with a constant drive current. In this case, a winding speed of the ink ribbon 12 increases and the tension of the ink ribbon 12 increases. According to the embodiment, the preliminary correction is performed based on the printing data of the head control unit 55 corresponding to the tint of the color of the sheet 11 so that the tension of the ink ribbon 12 becomes constant. Therefore, even if the force required to separate the ink ribbon 12 from the sheet 11 changes depending on the tint of the color of the sheet 11, the tension acting on the ink ribbon 12 can be made constant.

The drive control unit 56 changes the drive currents of the feed motor 14 and the winding motor 16 based on the detection result from the tension detection unit 49 so that the tension of the ink ribbon 12 becomes constant.

Incidentally, continuous processing (for example, thermal transfer) on the long ink ribbon 12 is performed during the conveyance until the ink ribbon 12 is wound around the winding shaft 15 after the ink ribbon is drawn from a state wound around the supply shaft 13. To perform such processing uniformly in a longitudinal direction of the ink ribbon 12, it is desirable that the tension acting on the ink ribbon 12 during conveyance be maintained constant. Further, to properly wind the processed ink ribbon 12 from a center to the outer circumference, it is desirable that the tension of the ink ribbon 12 near the winding shaft 15 be maintained constant. According to the embodiment, since the drive currents of the feed motor 14 and the winding motor 16 are changed based on the detection result from the tension detection unit 49 so that the tension of the ink ribbon 12 becomes constant, the tension acting on the ink ribbon 12 can be made constant as much as possible.

Since the feed motor 14 and the winding motor 16 are DC motors, the following effects can be obtained. Even in a case in which aging deterioration and environmental change of the DC motor occur, the tension acting on the ink ribbon 12 can reliably be made constant. Here, the "aging deterioration" means that, in a case where the DC motor is used for a long time, a magnetic flux density of a magnetic field generated in a stator of the DC motor changes from an initial state. The "environmental change" means that a magnetic flux density and an armature resistance change due to changes in the environment such as a temperature and a humidity in which the DC motor is used.

Incidentally, the supply shaft 13 and the winding shaft 15 need to rotate so that the tension of the ink ribbon 12 becomes constant. To this end, it is necessary to make a generated torque of each of the feed motor 14 and the winding motor 16 constant. However, in a case in which each of the feed motor 14 and the winding motor 16 is the DC motor, when the aging deterioration and the environmental change occur, variables of the DC motor (a torque constant and an armature resistance) change, so that the generated torques change. If an ambient temperature can be grasped, in the above-mentioned environmental change, a change amount can be quantitatively obtained, but the aging deterioration is unknown. Therefore, a change amount of the variables in the DC motor is unknown. According to the embodiment, since the tension of the ink ribbon 12 can be obtained, a target value of the drive current to the DC motor at the time of thermal transfer can be calculated. Therefore, the generated torque of the DC motor can be made constant.

The one end of the support member 30 has a D-shaped cross section. The other end of the support member 30 has a cylindrical shape. The following effects are exhibited by the above configuration.

Since the one end of the support member 30 has a D-shaped cross section, the rotation around an axis can be restricted at the one end of the support member 30. That is, it is possible to position the support member 30 in the circumferential direction. Accordingly, a transmission direction of the external force to the strain gauges 40A and 40C is determined, so that the detection accuracy of the strain gauges 40A and 40C can be improved.

In addition, since the other end of the support member 30 has a cylindrical shape, rotation around the axis is not restricted at the other end of the support member 30, which facilitates attachment and detachment. For example, in a case in which the base 10a is attached to the other end of the support member 30, the base 10a can be easily attached to and detached from the other end of the support member 30.

The external force measurement sections 31A and 31B are provided at both ends of the support member 30. The strain gauges 40A and 40C are provided at the external force measurement sections 31A and 31B of both ends of the support member 30. The following effects are exhibited by the above configuration.

The tension of the ink ribbon 12 can be detected at both ends in a well-balanced and highly accurate manner as compared with the case in which the strain gauges 40A and 40C are provided only at one end of the support member 30.

The support member 30 includes the column portion 32 having a cylindrical shape, and the beam portions 33A and 33B which each have the external force measurement sections 31A and 31B on both surfaces and are formed of the same member as the column portion 32 in a beam shape. The following effects are exhibited by the above configuration.

In addition, the rigidity of the external force measurement sections 31A and 31B can be improved and the influence such as vibration can be reduced as compared with a case in which the beam portions 33A and 33B are formed of a different member from the column portion 32. Therefore, the tension of the ink ribbon 12 can be detected with higher accuracy. In addition, a rigidity of the support member 30 itself can be improved, and the adverse influence on the winding of the ink ribbon 12 due to the vibration of the support member 30 can be suppressed as much as possible. Therefore, a high speed response is further excellent.

Other modification examples of the embodiment will be described.

In the embodiment, the case in which both ends of the support member 30 are fixed to the base 10a has been described, but the present embodiment is not limited to this. For example, one end of the support member 30 may be fixed to the base 10a. For example, the support member 30 may be cantilevered with respect to the base 10a. That is, one end or both ends of the support member 30 may be fixed to the base 10a.

In the embodiment, the case in which the support member 30 disposed horizontally has been described, but the present embodiment is not limited to this. For example, the support member 30 may be disposed vertically. For example, the support member 30 may be disposed to obliquely intersect the horizon.

In the embodiment, the case in which the continuous body is the ink ribbon 12 has been described, but the present embodiment is not limited to this. For example, the continuous body may be a band-shaped sheet such as paper, film, and metal foil, or a band-shaped continuous body such as a wire.

In the embodiment, the case in which a printing target is the sheet 11 (paper) has been described, but the present embodiment is not limited to this. For example, the printing target may be a surface of a sticker with a back surface thereof coated with an adhesive or the like.

In the embodiment, the case in which the external force detection unit is the strain gauges 40A to 40D has been described, but the present embodiment is not limited to this. For example, the external force detection unit may be another detection unit such as a system using a moire image or a piezoelectric sensor using a piezo effect. For example, the external force detection unit may be a sensor that measures a displacement amount of the end portion of the support member 30 with light (laser), infrared light, ultrasonic waves, or the like. For example, the external force detection unit may be an arm mechanism and a mechanism including a spring (a mechanism that uses an expansion and contraction amount of the spring). For example, the external force detection unit may be a displacement sensor such as a contact type differential transformer, a contact type or non-contact type linear gauge, or a non-contact type magnetic sensor. That is, the external force detection unit can employ various aspects as long as they are means capable of detecting an external force (a pressure of the continuous body).

In the embodiment, the case in which the drive control unit 56 changes the drive currents of the feed motor 14 and the winding motor 16 has been described, but the present embodiment is not limited to this. For example, the drive control unit 56 may make the drive currents of the feed motor 14 and the winding motor 16 constant. For example, the drive control unit 56 may control the drive current of the feed motor 14 to be a target value of an armature current of the feed motor 14. For example, the drive control unit 56 may control the drive current of the winding motor 16 to be a target value of an armature current of the winding motor 16.

For example, a control aspect of the drive control unit 56 can be arbitrarily changed.

For example, the drive control unit 56 may detect a rotation speed of the winding motor 16 during thermal transfer and calculate a winding speed of the ink ribbon 12 based on the detected rotation speed of the winding motor 16. For example, the drive control unit 56 may compare the calculated winding speed of the ink ribbon 12 and the conveyance speed of the sheet 11 and change the drive current of the winding motor 16 based on the comparison result. For example, the drive control unit 56 may change the target value of the armature current of the winding motor 16 based on the comparison result. For example, the drive control unit 56 may determine whether or not the detected value of the tension of the ink ribbon 12 deviates from the target value, and change the drive current of the winding motor 16 based on the determination result. For example, the control by the drive control unit 56 may be always performed during thermal transfer, or may be performed only in a case in which a difference between the winding speed of the ink ribbon 12 and the conveyance speed of the sheet 11 is larger than a threshold value. Here, an example of the control of the winding motor 16 has been described, but the drive control unit 56 may perform the same control on the feed motor 14 as the winding motor 16.

In the embodiment, the case where the one end of the support member 30 has a D-shaped cross section has been described, but the present embodiment is not limited to this. For example, the one end of the support member 30 may have a cylindrical shape.

In the embodiment, the case where the other end of the support member 30 has a cylindrical shape has been described, but the present embodiment is not limited to this.

For example, the other end of the support member 30 may have a D-shaped cross section.

For example, the shapes of the one end and the other end of the support member 30 can be changed according to the required specifications.

In the embodiment, the case where the external force measurement sections 31A and 31B are provided at both ends of the support member 30 has been described, but the present embodiment is not limited to this. For example, the external force measurement sections 31A and 31B may be provided only at the one end of the support member 30. In the embodiment, the case where the strain gauges 40A and 40C are provided at the external force measurement sections 31A and 31B of both ends of the support member 30 has been described, but the present embodiment is not limited to this. For example, the strain gauges 40A and 40C may be provided only at the one end of the support member 30.

For example, installation positions of the external force measurement sections 31A and 31B and installation positions of the strain gauges 40A to 40D can be changed according to the required specifications.

In the embodiment, the case in which the support member 30 includes the column portion 32 having a cylindrical shape, and the beam portions 33A and 33B which each have the external force measurement sections 31A and 31B on both surfaces and are formed of the same member as the column portion 32 in a beam shape has been described, but the present embodiment is not limited to this. For example, the beam portions 33A and 33B may be formed of a member different from the column portion 32. For example, the beam portions 33A and 33B may each have the external force measurement section on only one surface thereof. That is, the beam portions 33A and 33B may each have the external force measurement section on at least one surface thereof.

In the embodiment, the case in which the tension detection unit 49 is applied to the thermal printer 1 has been described, but the present embodiment is not limited to this. For example, the tension detection unit 49 may be applied to a tension detection device. For example, the tension detection device may include the base 10a, the support member 30, one end or both ends of which are fixed to the base 10a, and which has the external force measurement section integrally provided at the one end or both ends, and the continuous body that is conveyed while wound around the outer circumference of the support member 30, the external force detection unit that is provided at the external force measurement section of the support member 30 and detects an external force, and the tension detection unit 49 that detects tension of the continuous body based on the detection result from the external force detection unit.

The tension detection unit 49 is not limited to being applied to the tension detection device, but may be applied to a tension detection system. For example, a tension detection system 100 may include a tension detection device 101 including the tension detection unit 49, and a storage device 103 that stores the detection result from the tension detection device 101 (refer to FIG. 20). For example, the detection result from the tension detection device 101 which is stored in the storage device 103 may be used for feedback control of another tension detection device 102. For example, data regarding the detection results by the predetermined tension detection devices 101 and 102 may be uploaded to the external storage device 103. For example, in a case in which the storage device 103 stores tension data of a predetermined printer, the tension data may be used for the correction of another printer. For example, in a case in which the storage device 103 stores data that deviates from the target value by a predetermined amount when the tension detection system has been used for a predetermined number of years, it is possible to correct the deviation due to the aging deterioration.

Figure 21:
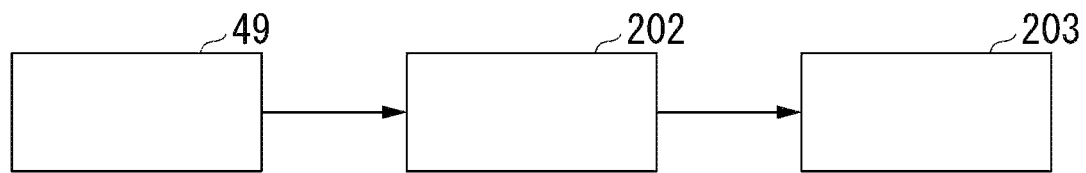
FIG. 21 is a diagram showing a configuration example of a tension detection device according to a second modification example of the embodiment.

For example, a tension detection device 201 may further include a tension determination unit 202 that determines whether or not the detection result from the tension detection unit 49 exceeds a threshold value, and a notification unit 203 that performs notification of an abnormality based on the determination result from the tension determination unit 202 (refer to FIG. 21). For example, the notification unit 203 performs notification of the abnormality in a case in which the detection result from the tension detection unit 49 exceeds the threshold value. For example, in a case of performing notification of the abnormality, the notification unit 203 may display a warning on the display unit 2 or issue an alarm.

For example, in a case in which the external force detection unit is provided at both ends of the support member 30, the tension determination unit 202 may determine whether or not the detection result from the external force detection unit exceeds the threshold value based on the detection results by both external force detection units. For example, the tension determination unit 202 may determine whether or not the detection result from the external force detection unit exceeds the threshold value based on the detection result from any one of the external force detection units. In this case, the notification unit 203 may perform notification of the abnormality in a case in which the detection result from the one external force detection unit exceeds the threshold value. For example, in a case in which the detection result from at least one of the external force detection units exceeds the threshold value, it can be estimated that a printing defect has occurred.

In the embodiment, the case in which the detection value of the strain gauge is corrected when the slack of the ink ribbon 12 is evaluated has been described, but the present embodiment is not limited to this. For example, data (correlation data) having a relationship correlated with the slack of the ink ribbon 12 may be acquired. For example, by acquiring the correlation data, a measurement error or an obstacle due to dust such as paper dust is less likely to be caused, so that reliable measurement can be performed.

According to at least one embodiment described above, the tension detection device includes the base 10a, the support member 30, the continuous body 12, the external force detection units 40A to 40D, and the tension detection unit 49. In the support member 30, the one end or the both ends of the support member 30 are fixed to the base 10a. The support member 30 has the external force measurement sections 31A and 31B integrally provided at the one end or both ends of the support member 30. The continuous body 12 is conveyed while wound around the outer circumference of the support member 30. The external force detection units 40A to 40D are provided at the external force measurement sections 31A and 31B of the support member 30. The external force detection units 40A to 40D detects an external force. The tension detection unit 49 detects tension of the continuous body 12 based on the detection results by the external force detection units 40A to 40D. With such a configuration, the tension of the continuous body 12 can be detected with high accuracy.

Note that a part or all of the thermal printer 1 in the above-described embodiment may be realized by a computer. In that case, a program for realizing a control function thereof may be recorded in a computer-readable recording medium, and the program recorded in the recording medium may be read and executed by a computer system, thereby realizing the control function.

Note that the "computer system" mentioned here is a computer system built in the thermal printer 1 and includes an OS and hardware such as peripheral devices. Further, the "computer-readable recording medium" refers to a portable medium such as a flexible disk, a magneto-optical disk, a ROM, a CD-ROM, or a storage device such as a hard disk built in a computer system.

Further, the "computer-readable recording medium" may include one that dynamically holds a program for a short time, such as a communication line of a case of transmitting the program via a network such as the Internet or a communication line such as a telephone line, and one that holds the program for a certain period of time, such as a volatile memory inside the computer system that serves as a server or a client in that case. Further, the above program may be one for realizing some of the functions described above, or may be one that can realize the above functions in combination with a program already recorded in the computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A tension detection device comprising:
   a base;
   a support member, one end or both ends of which are fixed to the base, and which has an external force measurement section integrally provided at the one end or both ends thereof;
   a continuous body which is conveyed while wound around an outer circumference of the support member;
   an external force detection unit which is provided at the external force measurement section of the support member to detect an external force; and
   a tension detection unit which detects tension of the continuous body based on a detection result from the external force detection unit.

2. The tension detection device according to claim 1, further comprising:
   a supply shaft around which one end of the continuous body is wound;
   a first drive unit which drives the supply shaft;
   a winding shaft around which the other end of the continuous body is wound;
   a second drive unit which drives the winding shaft; and
   a drive control unit which controls the first drive unit and the second drive unit based on the tension of the continuous body from the tension detection unit.

3. The tension detection device according to claim 2, further comprising:
   a platen roll which brings the continuous body and a sheet into pressure contact with each other; and
   a third drive unit which drives the platen roll,
   wherein the drive control unit controls the third drive unit based on the tension of the continuous body from the tension detection unit.

4. The tension detection device according to claim 3, further comprising:
   a thermal head which faces the platen roll; and
   a head control unit which controls the thermal head,
   wherein the drive control unit corrects in advance a drive current of the second drive unit based on printing data of the head control unit so that tension of the continuous body becomes constant.

5. The tension detection device according to claim 2, wherein the drive control unit changes drive currents of the first drive unit and the second drive unit based on the detection result from the tension detection unit so that tension of the continuous body becomes constant.

6. The tension detection device according to claim 1,
   wherein one end of the support member has a D-shaped cross section, and
   wherein the other end of the support member has a cylindrical shape.

7. The tension detection device according to claim 1,
   wherein the external force measurement section is provided at both ends of the support member, and
   wherein the external force detection unit is provided at the external force measurement section of both ends of the support member.

8. The tension detection device according to claim 1, wherein the support member includes
   a column portion having a cylindrical shape, and
   a beam portion which has the external force measurement section on at least one surface thereof and is formed of the same member as the column portion in a beam shape.

9. The tension detection device according to claim 1, further comprising:
   a tension determination unit which determines whether or not the tension of the continuous body from the tension detection unit exceeds a threshold value; and
   a notification unit which performs notification of an abnormality based on a determination result from the tension determination unit.

10. A tension detection system comprising:
    the tension detection device according to claim 1; and
    a storage device that stores the tension of the continuous body from the tension detection device.

* * * * *